United States Patent [19]

Hiroi

[11] Patent Number: 5,105,138
[45] Date of Patent: Apr. 14, 1992

[54] TWO DEGREE OF FREEDOM CONTROLLER

[75] Inventor: Kazuo Hiroi, Tokyo, Japan

[73] Assignee: Kabushiki Kaisha Toshiba, Kawasaki, Japan

[21] Appl. No.: 577,558

[22] Filed: Sep. 5, 1990

[30] Foreign Application Priority Data

Sep. 11, 1989 [JP] Japan .................. 1-234959
Dec. 6, 1989 [JP] Japan .................. 1-315486
Dec. 28, 1989 [JP] Japan .................. 1-344366

[51] Int. Cl.$^5$ .................. G05B 5/00; G05B 11/42
[52] U.S. Cl. .................. 318/610; 318/609; 318/632; 318/621; 364/151
[58] Field of Search .................. 364/150–177, 364/148, 149; 318/560–630

[56] References Cited

U.S. PATENT DOCUMENTS

| | | | |
|---|---|---|---|
| 4,539,633 | 9/1985 | Shigemasa et al. | 318/610 X |
| 4,563,735 | 1/1986 | Hiroi et al. | 318/632 X |
| 4,641,235 | 2/1987 | Shigemasa et al. | 318/610 |
| 4,675,804 | 6/1987 | Wiemer | 318/609 X |
| 4,714,988 | 12/1987 | Hiroi et al. | 318/632 |
| 4,755,924 | 7/1988 | Hiroi | 364/148 |
| 4,874,999 | 10/1989 | Kuwabara et al. | 318/610 |
| 4,953,076 | 8/1990 | Yamamoto | 318/621 X |
| 4,959,767 | 9/1990 | Buchner et al. | 364/151 |

FOREIGN PATENT DOCUMENTS 2914732 10/1979 Fed. Rep. of Germany .
58-75207 5/1983 Japan .
63-46502 2/1988 Japan .
63-46503 2/1988 Japan .

OTHER PUBLICATIONS

ISA, 1986, Paper No. 86-2708 "Two Degrees of Freedom Algorithm" pp. 789–796, K. Hiroi et al.

Primary Examiner—Paul Ip
Attorney, Agent, or Firm—Oblon, Spivak, McClelland, Maier & Neustadt

[57] ABSTRACT

A two degree of freedom PID controller which includes a setpoint filter for performing a derivative operation on a process disturbance signal in accordance with a setpoint value and a control value of a controlled system, thereby outputting a setpoint signal, a PI-control operation device for determining a deviation between the setpoint signal and the control value, and performing a PI-control operation on the deviation, thereby outputting a manipulative signal, and an adder for adding the process disturbance signal to the manipulative signal output by the PI-control operation device, thus obtaining a sum signal, and for supplying the sum signal to the controlled system.

18 Claims, 16 Drawing Sheets

F I G. 3A
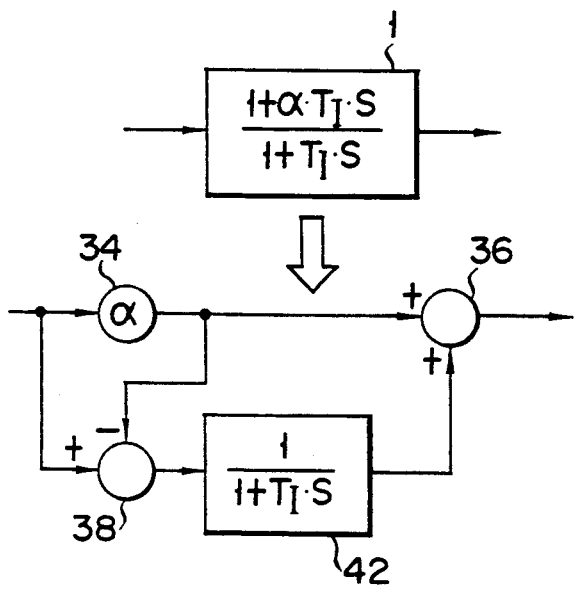
F I G. 3B
F I G. 4A
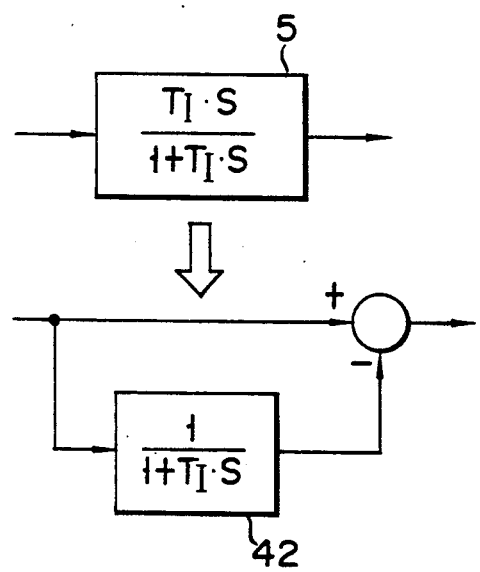
F I G. 4B

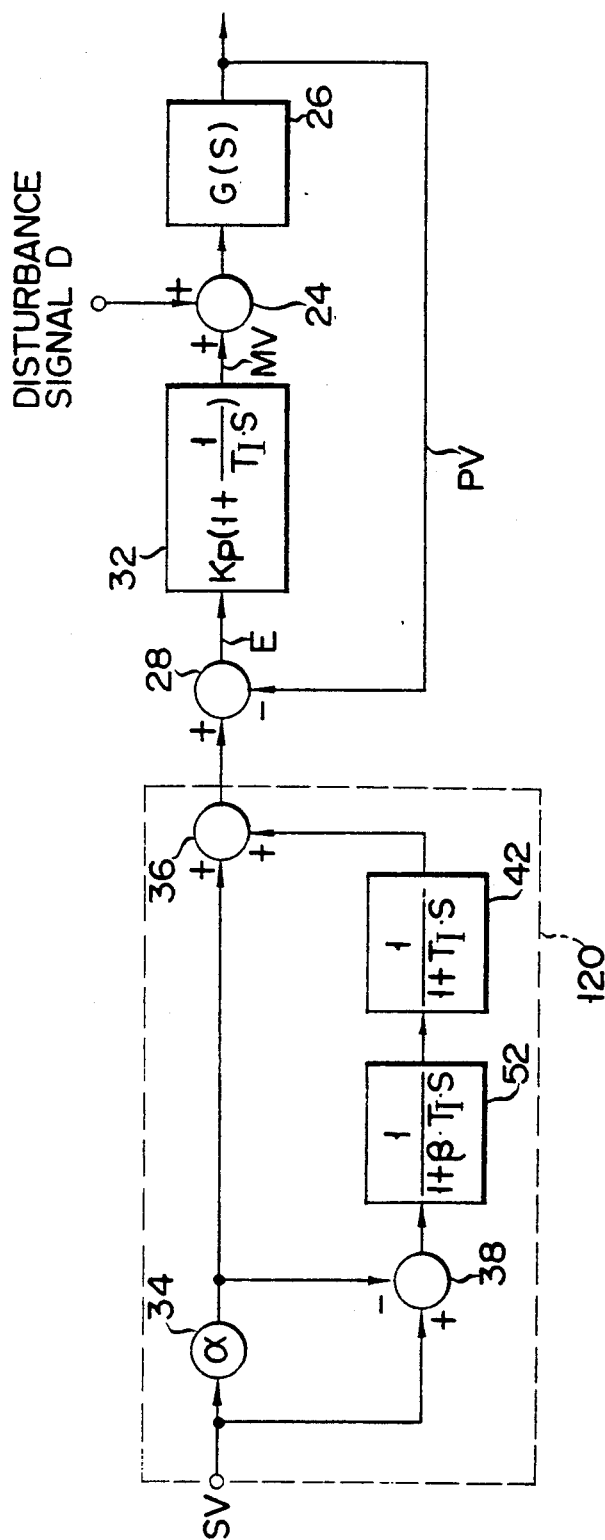
F I G. 7

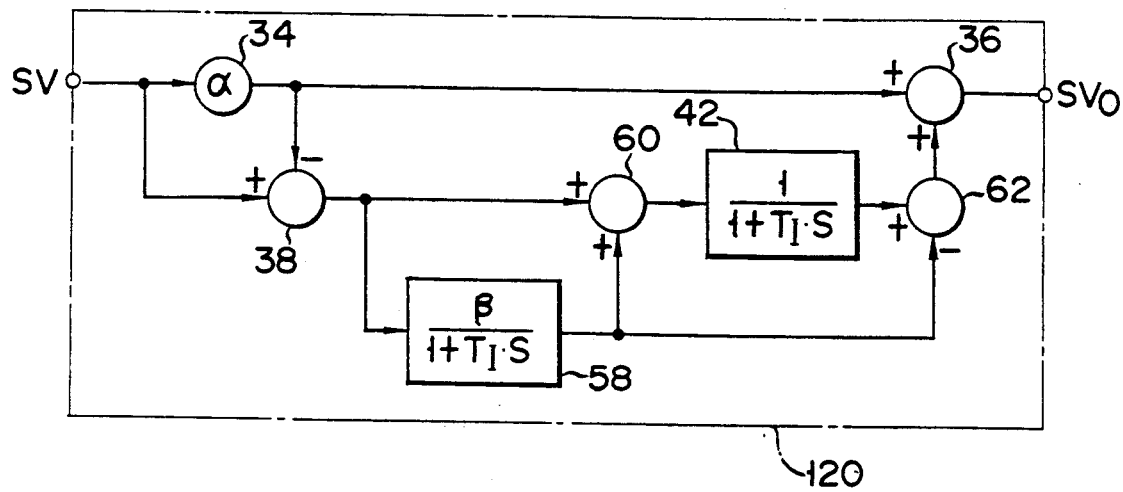
F I G. 10
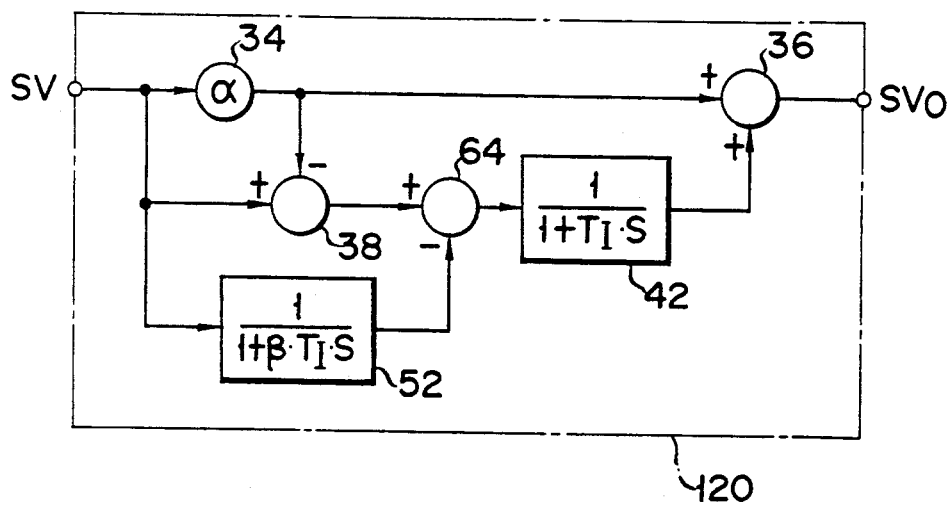
F I G. 11

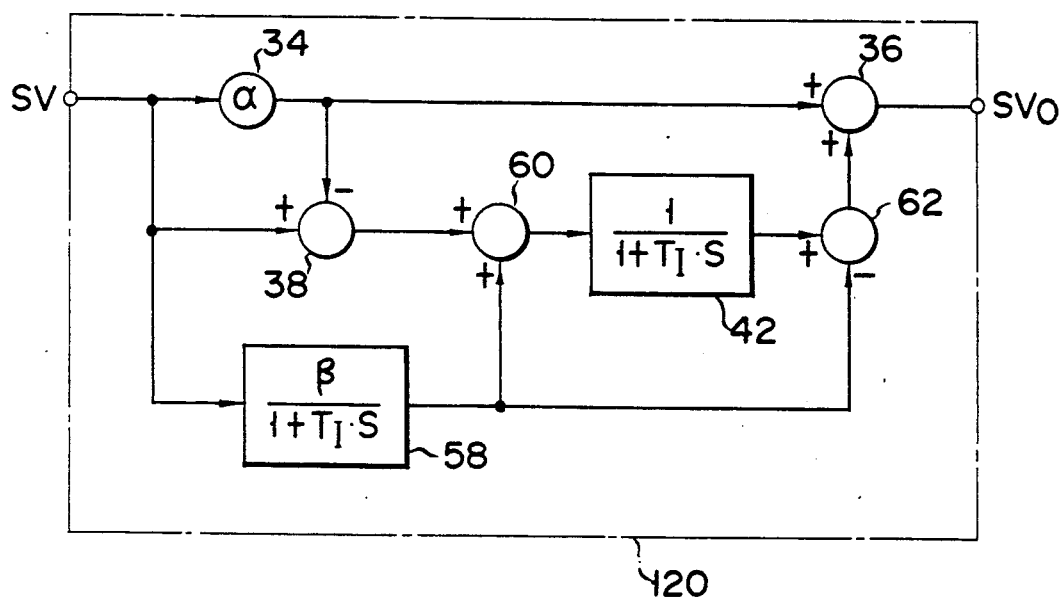
F I G. 12

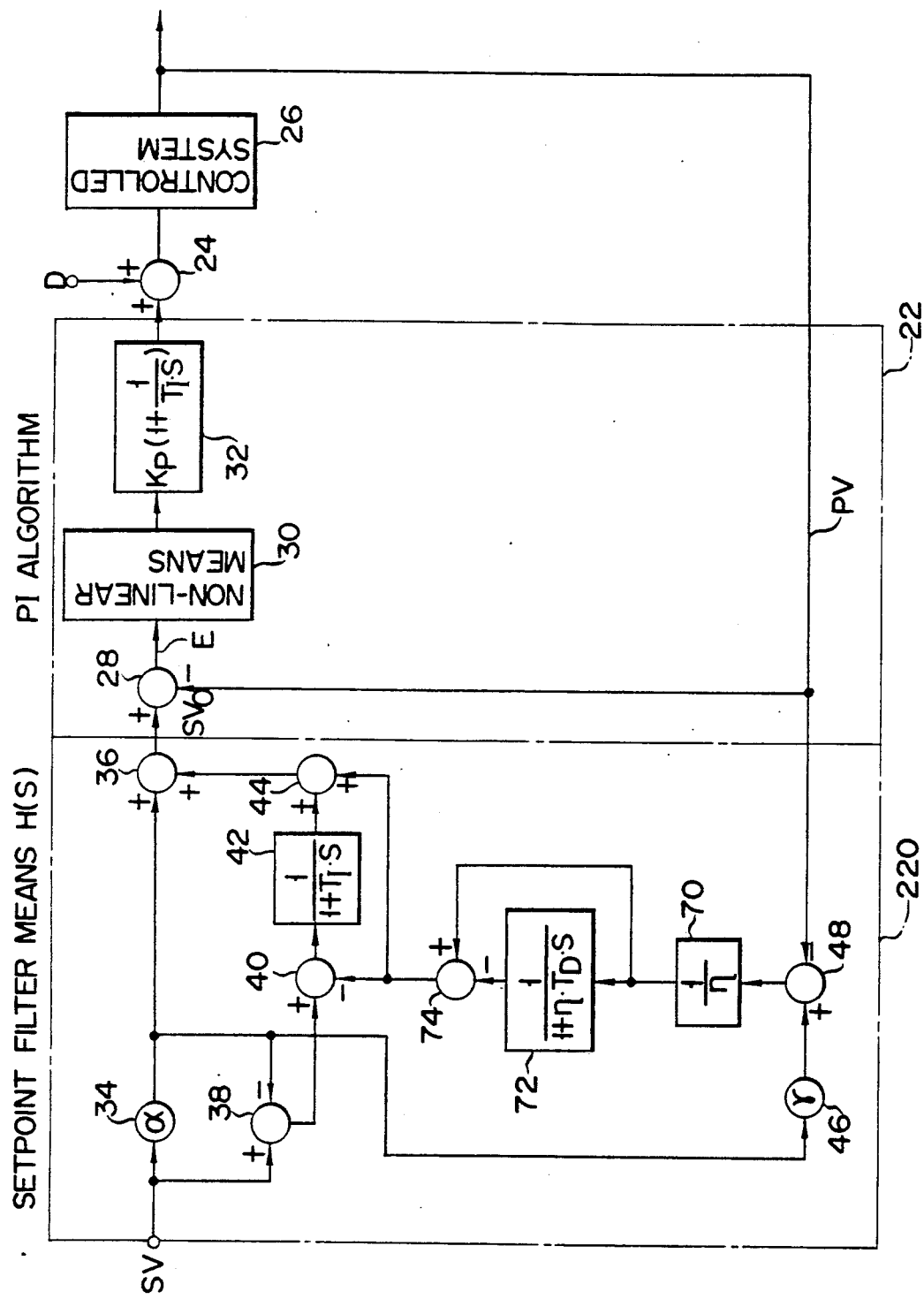
F I G. 13

F I G. 14A 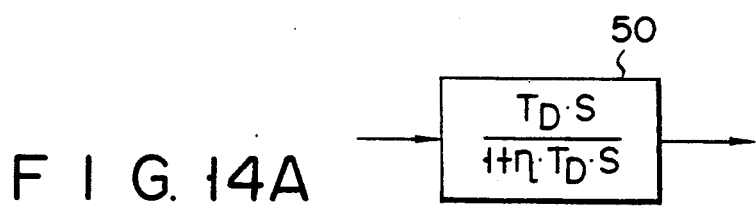
F I G. 14B 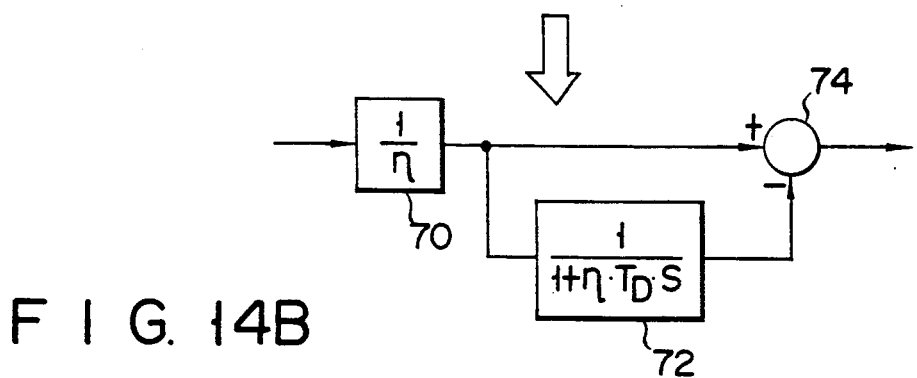

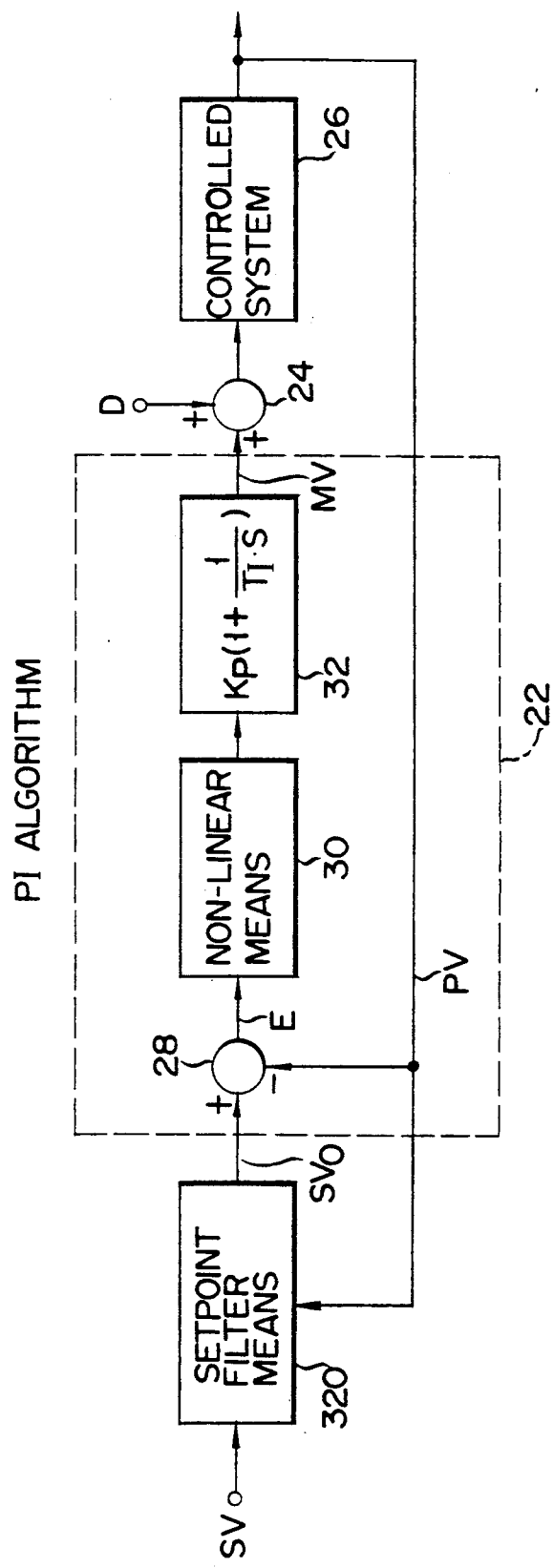
F I G. 16

TWO DEGREE OF FREEDOM CONTROLLER

BACKGROUND OF THE INVENTION

1. Field of the Invention

The present invention relates to a two degree of freedom controller which performs an optimal control of process disturbances, and a control optimal for following target process values or setpoint values.

2. Description of the Related Art

PID controllers have been used in various fields of industry. Recently, digital PID controllers are used in increasing numbers, in place of analog PID controllers, and are now indispensable in controlling plants. A digital PID controller performs the following fundamental operation:

$$MV(s) = K_P\{1 + 1/(T_I s) + (T_D s)\} E(s) \quad (1)$$

where $MV(s)$ is a manipulative variable, $E(s)$ is a deviation, $K_p$ is a proportional gain, $T_I$ is an integral time, $T_D$ is a derivative time, s is a Laplace operator, $\eta$ is a coefficient, and $1/\eta$ is a derivative gain. Equation (1) defines a PID control for a deviation E, which is generally known as "deviation PID control."

In the deviation PID control, however, the set point SV changes stepwise in many cases. In accordance with a change in the setpoint value SV, the PID controller performs an excessive D (Derivative) operation, whereby the manipulative variable MV greatly changes. As a result, the PID controller gives a shock to the controlled system. Alternatively the setpoint-following characteristic of the PID controller undergoes overshoot, whereby the controller inevitably performs a vibrational operation.

In recent years, a new type of a PID controller, which performs a D operation on PV, not on a deviation, has been put to practical use. This PID controller performs the following operation:

$$MV(s) = K_P[\{1 + 1/(T_I s)\} E(s) \\ - \{(T_D s)/(1 + \eta T_D s)\} PV(s)] \quad (2)$$

where $PV(s)$ is a control value supplied from the controlled system.

Equations (1) and (2) each define a one degree of freedom PID controlling operation. Only one set of PID parameters can be set. In actual controlled systems, the optimal PID parameter best for controlling the process disturbances and the PID parameter best for following the setpoint have different values.

In 1963, Issac I. Horowitz published an algorithm of two degrees of freedom PID (2DOF PID), in which two sets of parameters can be set independently and which enables a PID controller not only to control process disturbances efficiently, but also to follow the setpoint values accurately. This algorithm has since been applied to many PID controllers, which are actually used, carrying out high-level plant control. In this 2DOF PID algorithm, PID parameters optimal for controlling process disturbances are set first. When the setpoint value is altered, the PID parameters are automatically changed in accordance with the coefficient of the setpoint filter selected for the new setpoint value.

FIG. 1 is a block diagram showing a 2DOF PID controller of the type used commonly, which comprises a setpoint filter means H(s) and a PID controller (derivative-on-PV type). As is shown in FIG. 1, the setpoint filter means H(s) is connected to the input of the PID controller, and comprises a lead/lag means 1, a 1st lag means 2, an incomplete derivative means 3, a subtracter means 4, an incomplete integral means 5, an adder means 6. The lead/lag means 1 imparts a lead or a lag to a setpoint value SV. The 1st lag means 2 imparts a 1st lag to the setpoint value SV. The incomplete derivative means 3 sets an upper limit to the derivative gain, and also delay derivative operation. The subtracter means 4 subtracts the output of the 1st lag means 2 from the output of the incomplete derivative means 3. The incomplete integral means 5 delays the output of the subtracter means 4. The adder means 6 adds the output of the lead/lag means 1 and that of the incomplete derivative means 5. The output $SV_0$ of the adder means 6, or the output $SV_0$ of the setpoint filter means H(s) is supplies to the PID controller as a setpoint.

The PID controller of the derivative-on-PV type comprises a deviation-calculating means 7, a non-linear means 8, a PI-control operation means 9, a subtracter means 10, and an incomplete derivative means 11. The deviation-calculating means 7 receives the output $SV_0$ of the adder means 6 and also the control value PV supplied from a controlled system 12, and calculates a deviation E from the output $SV_0$ and the control value PV. The deviation E, thus obtained, is input to the non-linear means 8. The non-linear means 8 performs non-linear operations on the deviation E, which include dead-band operation, deviation-square operation, and gain-change operation, thus producing an output. The output of the means 8 is input to the PI-control operation means 9. The operation means 9 performs a PI-control operation on the output of the non-linear means 8, said PI-control operation defined by the first term of the right side of equation (2), whereby producing a PI-control value. The PI-control value is supplied to the subtracter means 10.

Meanwhile the control value PV is supplied from the controlled system 12 to the incomplete derivative means 11. The incomplete derivative means 11 performs an incomplete derivative operation on the control value PV, said incomplete derivative operation defined by the second term of the right side of equation (2), whereby producing an incomplete derivative value. The incomplete derivative value is input to the subtracter means 10. The subtracter means 10 subtracts the incomplete derivative value from the PI-control value, thereby obtaining a manipulative variable MV.

The manipulative variable MV is supplied to an adder means 13, to which a process-disturbance signal D is also supplied. The adder means 13 adds the variable MV and the signal D. The sum of the variable MV and the signal D is input to the controlled system 12, whereby the system 12 is controlled such that the control value PV becomes equal to the setpoint value $SV_0$, that is, $SV_0 = PV$.

Hence, the algorithm $C_D(s)$ for controlling process disturbances is represented by the following:

$$C_D(s) = K_P\{1 + 1/(T_I s) + (T_D s)/(1 + \eta T_D s)\} \quad (3)$$

On the other hand, the algorithm $C_{SV}(s)$ for controlling the setpoint value is defined as follows:

$$C_{SV}(s) = K_P[\alpha + \{1/(T_I s) - \beta_0/(1 + T_I s)\} + (\gamma_0 T_D s)/(1 + \eta T_D s)] \quad (4)$$

First, parameters $K_p$, $T_I$, and $T_D$ are set to such values that the 2DOF PID controller may have an optimal process-disturbance control characteristic. Then, 2DOF coefficients $\alpha$, $\beta_0$, and $\gamma_0$ are determined so that the 2DOF PID controller may have the best possible setpoint-following characteristic. Once the 2DOF PID controller has an optimal process-disturbance control characteristic and an optimal setpoint-following characteristic, the parameters $K_p$, $T_I$, and $T_D$ can be varied in accordance with the coefficients $\alpha$, $\beta_0$, and $\gamma_0$ thus coping with changes in the control value PV. As a result of this, the controller can perform a two degree of freedom PID control.

The two degree of freedom PID control, described above, is advantageous in many respects, but disadvantageous in the following respects.

1. As is evident from equation (4), the 2DOF coefficients $\alpha$, $\beta_0$ and $\gamma_0$ are independent of one another, though they must be interrelated. Hence, the coefficients $\beta_0$ and $\gamma_0$ must be changed independently when the coefficient $\alpha$ is changed. It takes much time to adjust the coefficients $\beta_0$ and $\gamma_0$.

2. As has been described, the setpoint filter means H(s) and the PID controller (derivative-on-PV type) have 1st lag means and incomplete derivative means, and several tens to several thousands of 2DOF PID controls are effected in most cases in order to control a plant. Hence, a plant-controlling system needs to have a number of 1st lag means and a number of incomplete derivative means. The load of the system is great, making it difficult for the system to operate at high speed and inevitably not rendering the system a low-capacity one.

3. To control a plant, a deviation is subjected to non-linear operation in many cases. The non-linear operation cannot be achieved with ease, accuracy or freedom.

That is, a non-linear operation is performed on a deviation in many cases to control a plant, since the plant cannot be controlled in accordance with the deviation E only, because of the characteristic of the controlled system 12. This is why the non-linear means is connected to the input of the PI-control operation means 9, for performing non-linear operations on the deviation E, such as dead-band operation, deviation-square operation, gain-change operation, and gap operation. Since the incomplete derivative means 11 is bypassed to the output of the PI-control operation mean 9, the output of the incomplete derivative means 11 is not subjected to the non-linear operation. Consequently, the results of the non-linear operation are not accurate, inevitably reducing the reliability of the two degree of freedom PID control.

SUMMARY OF THE INVENTION

The first object of the present invention is to provide a two degree of freedom controller which can automatically alter the gain of a derivative term when a 2DOF coefficient c of a proportional gain is changed.

The second object of the invention is to provide a two degree of freedom controller which uses a small number of time elements and which is therefore small, has a small load, and can operate at high speed.

The third object of this invention is to provide a two degree of freedom controller which performs nonlinear operations, including a derivative operation, with ease, accuracy, and freedom, thus controlling a system with high efficiency.

To accomplish the above objects, there is provided a two degree of freedom controller according to the invention, which comprises:

setpoint filter means for performing a derivative operation on a process disturbance signal in accordance with a setpoint value and a control value of a controlled system, thereby outputting a setpoint signal;

PI-control operation means for determining a deviation between the setpoint signal and said control value, and performing a PI-control operation on the deviation, thereby outputting a manipulative signal; and adder means for adding the process disturbance signal to the manipulative signal output by the PI-control operation means, thus obtaining a sum signal, and for supplying the sum signal to the controlled system.

The PI-control operation means may include non-linear means for performing a non-linear operation on the deviation.

Therefore, the setpoint filter means and the PI-control operation means cooperate, easily performing two degree of freedom PID control.

The setpoint filter means is connected to the input of the PI-control operation means, and performs a derivative operation on a process disturbance signal in accordance with the setpoint value and the control value, the PI-control operation means can perform non-linear operations with accuracy and freedom, thus accomplishing a two degree of freedom PID control.

In a preferred embodiment of the invention, the setpoint filter means includes:

gain coefficient multiplying means for multiplying the setpoint value by a two degree of freedom coefficient of a proportional gain, thereby outputting a first product;

first subtracter means for subtracting the first product from the setpoint value, thereby outputting a first difference;

first 1st lag means having a two degree of freedom coefficient for an integral time, for performing 1st lag operation on the first difference, thereby outputting a first result of the 1st lag operation;

derivative time coefficient multiplying means for multiplying the first product by a two degree of freedom coefficient of a derivative time, thereby outputting a second product;

second subtracter means for subtracting the control value from the second product, thereby outputting a second difference;

incomplete derivative means for receiving the second difference and performing incomplete derivative operation on the second difference, thereby outputting a result of the incomplete derivative operation;

third subtracter means for subtracting the result of the incomplete derivative operation from the first result of 1st lag operation, thereby outputting a third difference;

second 1st lag means for performing 1st lag operation on the third difference, thereby outputting a second result of 1st lag operation;

first adder means for adding the second result of 1st lag operation to the result of incomplete derivative operation, thereby outputting a first sum; and second adder means for adding the first sum to the first product, thereby obtaining a second sum, and for supplying the second sum, as setpoint signal, to the PI-control operation means.

In another preferred embodiment of the invention, the setpoint filter means includes:

gain coefficient multiplying means for multiplying the setpoint value by a two degree of freedom coefficient of a proportional gain, thereby outputting a first product;

first subtracter means for subtracting the first product from the setpoint value, thereby outputting a first difference;

first 1st lag means having a two degree of freedom coefficient for a integral time, for performing 1st lag operation on the first difference, thereby outputting a first result of the 1st lag operation;

derivative time coefficient multiplying means for multiplying the setpoint value by a two degree of freedom coefficient of a derivative time, thereby outputting a second product;

second subtracter means for subtracting the control from the second product, thereby outputting a second difference;

incomplete derivative means for receiving the second difference and performing incomplete derivative operation on the second difference, thereby outputting a result of the incomplete derivative operation;

third subtracter means for subtracting the result of the incomplete derivative operation from the first result of 1st lag operation, thereby outputting a third difference;

second 1st lag means for performing 1st lag operation on the third difference, thereby outputting a second result of 1st lag operation;

first adder means for adding the second result of 1st lag operation to the result of incomplete derivative operation, thereby outputting a first sum; and second adder means for adding the first sum to the first product, thereby obtaining a second sum, and for supplying the second sum, as setpoint signal, to the PI-control operation means.

Alternatively, the setpoint filter means, which serves to achieve a two degree of freedom control with respect to a proportional gain and a derivative time, may include:

gain coefficient multiplying means for multiplying the setpoint value by a two degree of freedom coefficient of a proportional gain, thereby outputting a first product;

first subtracter means for subtracting the first product from the setpoint value, thereby outputting a first difference;

derivative time coefficient multiplying means for multiplying the first product by a two degree of freedom coefficient of a derivative time, thereby outputting a second product;

second subtracter means for subtracting the control value from the second product, thereby outputting a second difference;

incomplete derivative means for receiving the second difference and performing incomplete derivative operation on the second difference, thereby outputting a result of the incomplete derivative operation;

third subtracter means for subtracting the result of the incomplete derivative operation from the first difference, thereby outputting a third difference;

1st lag means for performing 1st lag operation on the third difference, thereby outputting a result of the 1st lag operation;

first adder means for adding the result of 1st lag operation to the result of incomplete derivative operation, thereby outputting a first sum; and second adder means for adding the first sum to the first product, thereby obtaining a second sum, and for supplying the second sum, as setpoint signal, to the PI-control operation means.

According to the invention, there is provided a two degree of freedom controller which comprises a setpoint filter means for receiving the derivative term of a control value, and a PI-control operation means including deviation-calculating means, PI control means, and non-linear means connected between the deviation-calculating means and the PI control means, for performing a non-linear operation on the derivative term.

To accomplish the above objects, there is provided a two degree of freedom controller according to the invention, which comprises:

setpoint filter means for receiving a setpoint value and generating a setpoint signal, including:

coefficient multiplying means for multiplying the setpoint value by a two degree of freedom coefficient for a proportional gain, thereby outputting a product;

1st lag means having at least a two degree of freedom coefficient for an integral time, and designed to subtract the product from the setpoint value, thereby generating a difference; and means for adding the product to the difference, thereby outputting the setpoint signal;

PI-control operation means for determining a deviation between the setpoint signal and a control value supplied from a controlled system, and performing a PI-control operation on the deviation, thereby outputting a manipulative signal; and adder means for adding a process disturbance signal to the manipulative signal output by the PI-control operation means, thus obtaining a sum signal, and for supplying the sum signal to the controlled system.

To accomplish the above objects, there is provided another two degree of freedom controller according to the invention, which comprises:

setpoint filter means for receiving a setpoint value and generating a setpoint signal, including:

coefficient multiplying means for multiplying the setpoint value by a two degree of freedom coefficient for a proportional gain, thereby outputting a product;

first 1st lag means designed to subtract the product from the setpoint value, thereby generating a difference;

second 1st lag means having at least a two degree of freedom coefficient for an integral time, and designed to delay the setpoint value and to output the setpoint value thus delayed; and means for adding the product to the delayed setpoint value output by the second 1st lag means, thereby outputting the setpoint signal;

PI-control operation means for determining a deviation between the setpoint signal and a control value supplied from a control system, and performing a PI-control operation on the deviation, thereby outputting a manipulative signal; and adder means for adding a process disturbance signal to the manipulative signal output by the PI-control operation means, thus obtaining a sum signal, and for supplying the sum signal to the controlled system.

As may be understood from the above, in order to impart two degrees of freedom to the proportional gain of the setpoint filter used in the conventional controller, a lead/lag means is decomposed into two components, the first being a static compensatory component which is proportional to the input, and the second being a dynamic compensatory component which changes, 1st delayed with respect to the input. A 1st lag means is connected in series to the dynamic compensatory component, and, hence, two 1st lag means are utilized to accomplish 2DOF PI control. Further, two degrees of freedom are imparted to the integral time, too, such that the magnitude of freedom of the integral time changes in an appropriate direction, as the two degree of freedom coefficient of the proportional gain varies.

Hence, the proportional gain for the setpoint value can be altered by changing the two degree of freedom coefficient of the proportional gain of the coefficient multiplying means, while maintaining the proportional gain parameters required for an optimal control of process disturbances. In addition, the integral time for the setpoint value can be equivalently altered merely by changing the two degree of freedom coefficient of the integral time of the 1st lag means, while maintaining the integral time for the process disturbance signal. A complete, two degree of freedom PI control can therefore be achieved. The integral time can be changed in an appropriate direction, by altering the two degree of freedom coefficient of the proportional gain. Furthermore, a complete, two degree of freedom PI control can be performed using only two 1st lag means.

According to the present invention, there is provided a still other two degree of freedom controller, which comprises:

gain coefficient multiplying means for multiplying a setpoint value by a two degree of freedom coefficient of a proportional gain, thereby outputting a first product;

derivative time coefficient multiplying means for multiplying the setpoint value by a two degree of freedom coefficient of a derivative time, thereby outputting a second product;

first 1st lag means for performing 1st lag operation on the setpoint value, thereby outputting a first result of the 1st lag operation;

integral time coefficient multiplying means for multiplying the result of the 1st lag operation by a two degree of freedom coefficient of an integral time, thereby outputting a third product;

incomplete derivative means for performing an incomplete derivative operation on the second product and a control value supplied from a controlled system, thereby outputting a result of the incomplete derivative operation;

second 1st lag means for performing 1st lag operation on the first product, the third product, and the result of the incomplete derivative operation, thereby operation;

first adder means for adding the first and second results of 1st lag operation, thereby outputting a setpoint signal;

PI-control operation means for determining a deviation between the setpoint signal and the control value and performing a PI-control operation on the deviation, thereby outputting a manipulative signal; and second adder means for adding a process disturbance signal to the manipulative signal, thus obtaining a sum signal, and for supplying the sum signal to the controlled system.

This two degree of freedom controller can impart complete two degrees of freedom to the proportional gain, the derivative time, and integral time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are diagrams explaining how a lead/lag means is equivalently converted;

FIGS. 4A and 4B are diagrams explaining how an incomplete integral means is equivalently converted;

FIG. 7 is a block diagram showing a PI controller according to a third embodiment of the invention;

FIG. 10 is a block diagram illustrating a setpoint filter used in a PI controller according to a fourth embodiment of the invention;

FIG. 11 is a block diagram illustrating a setpoint filter means incorporated in a PI controller according to a fifth embodiment of this invention;

FIG. 12 is a block diagram showing a setpoint filter means used in a PI controller according to a sixth embodiment of the present invention;

FIG. 13 is a block diagram illustrating a PID controller according to a seventh embodiment of the present invention;

FIGS. 14A and 14B are diagrams explaining how an incomplete derivative means is equivalently converted;

FIG. 16 is a block diagram illustrating a PID controller according to a ninth embodiment of the present invention;

DETAILED DESCRIPTION OF THE PREFERRED EMBODIMENTS

A 2DOF PID controller according to a first embodiment of the present invention will now be described, with reference to FIGS. 2, 3, 3A, 3B, 4A, and 4B.

Figure 2:
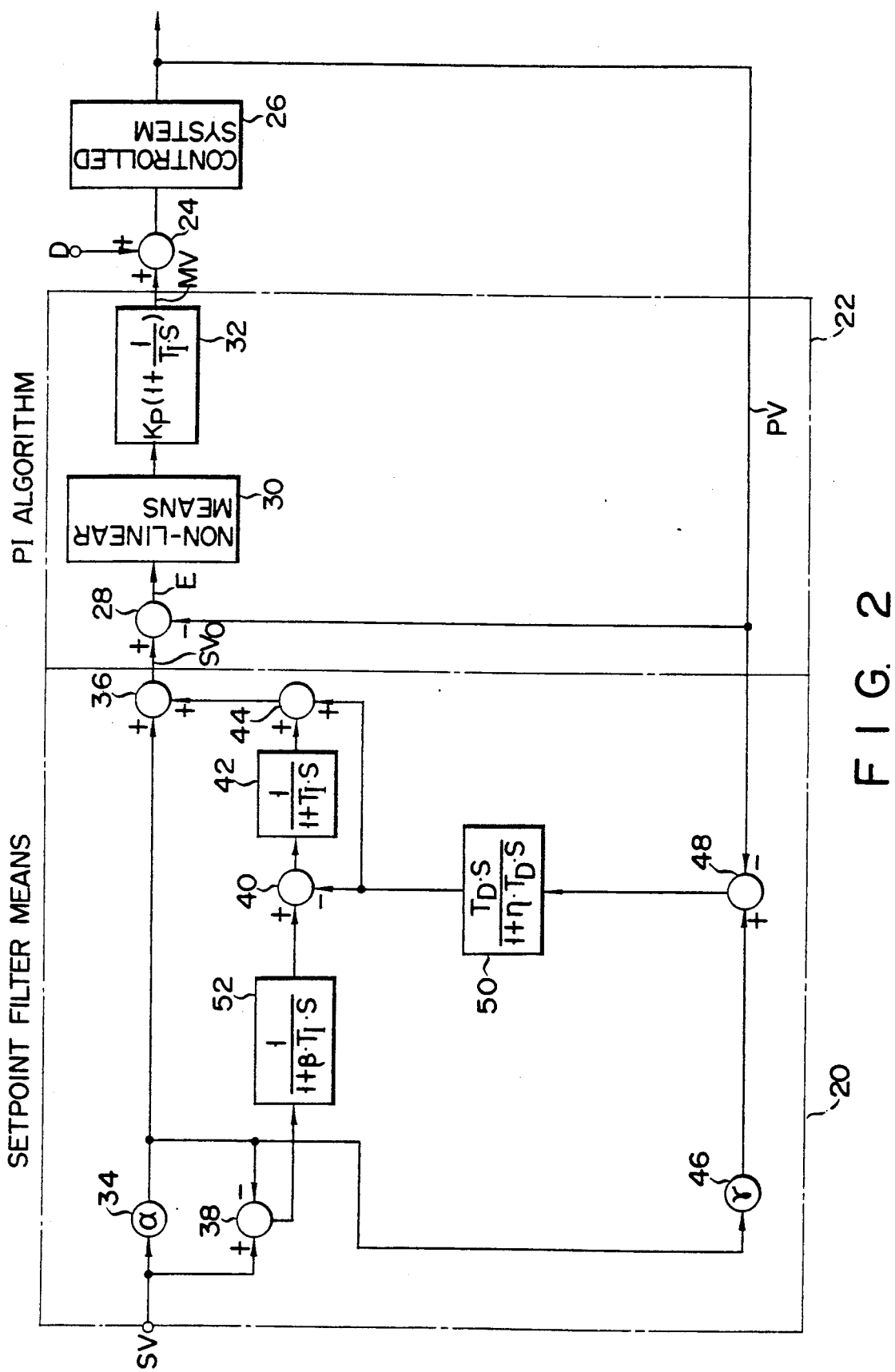
FIG. 2 is a block diagram showing a PID controller according to a first embodiment of this invention.

As is shown in FIG. 2, the 2DOF PID controller comprises a setpoint filter means 20, a PI-algorithm executing section 22, and an adder means 24. The adder means 24 is connected to a system 26 which the 2DOF PID controller controls.

The setpoint filter means 20 is designed to receive a setpoint value SV and perform operations on the value SV, thereby to impart two degrees of freedom to a proportional gain Kp, an integral time $T_I$, and a derivative time $T_D$. The PI-algorithm executing section 22 comprises a deviation-calculating means 28, a non-linear means 30, and a PI control means 32. The deviation-calculating means 28 receives an output $SV_0$ of the setpoint filter means 20 and also the control value PV supplied from the controlled system 26, and subtracts the control value PV from the output $SV_0$, thereby obtaining a deviation E; it performs the subtraction of $SV_0 - PV = E$. The non-linear means 30 performs a non-linear operation on the deviation E, if necessary, thus producing an output. The PI control means 32 performs a PI-control operation on the output of the non-linear means 30, thereby generating a manipulative variable MV.

The adder means 24 is designed to add a process disturbance signal D to the manipulative variable MV generated by the PI-algorithm executing section 22, thereby outputting the sum to the controlled system 26. As a result, the system 26 is controlled such that $SV = SV_0 = PV$.

As is illustrated in FIG. 2, the setpoint filter means 20 comprises a gain-coefficient multiplying means 34, a first adder means 36 connected to the output of the multiplying means 34, a first subtracter means 38 also connected to the output of the multiplier 34, a second subtracter means 40, a first 1st lag means 42 coupled to the output of the second subtracter means 40, a second adder means 44 connected to the output of the means 42, a time-coefficient multiplying means 46 connected to the multiplying means 34, a third subtracter means 48 coupled to the output of the multiplying means 46, an incomplete derivative means 50 coupled to the output of the third subtracter means 48, and a second 1st lag means 52 connected between the first subtracter means 38 and the second subtracter means 40.

As has been described, the setpoint filter means 20 imparts two degrees of freedom to the proportional gain, the integral time, and the derivative time. To impart two degrees of freedom to these items, the derivative term of the incomplete derivative means 11 (FIG. 1), which is bypassed to the output of the PI-control operation means 9, is supplied to the setpoint filter means 20. Further, less means are required than in the conventional 2DOF PID controller (FIG. 1), by common use of an integral of the control value, an integral and a derivative of the setpoint value, the proportional gain of the setpoint value and 1st lag of integral time.

First it will be explained how the means 20 imparts two degrees of freedom to the proportional gain. The gain-coefficient multiplier 34 multiplies the setpoint value SV by the 2DOF coefficient $\alpha$ of the proportional gain. The output of the multiplier 34, i.e., the product of SV and $\alpha$, is supplied to the first adder means 36 and also to the first subtracter means 38. The first subtractor means 38 subtracts the output $\alpha$ SV from the setpoint value SV. The output of the first subtracter means 38, i.e., the difference between SV and $\alpha$ SV, is input to the first adder means 36 through the second 1st lag means 52, the second subtracter means 40, the first 1st lag means 42, and the second adder means 44. The first adder means 36 adds the output of the second adder means 44 to the output of the gain-coefficient multiplying means 34, thus imparting two degrees of freedom to the proportional gain.

It will now be explained how the means 20 imparts two degrees of freedom to the derivative time. The output of the gain-coefficient multiplying means 34 is input to the time-coefficient multiplying means 46 in which the 2DOF coefficient $\gamma$ of derivative time is set. The time-coefficient multiplying means 46 multiplies the output of the means 34 by the coefficient $\gamma$, obtaining a product $\alpha \gamma$ SV. This product is input to the third subtracter means 48. The third subtracter 48 subtracts the control value PV of the system 26 from the product $\alpha \gamma$ SV, thus obtaining the difference, $\alpha \gamma$ SV $-$ PV. This difference is supplied to the second subtracter 40 and the second adder means 44, through the incomplete derivative means 50. The output of the second subtracter means 40 is supplied to the second adder means 44 via the first 1st lag means 42, whereas the output of the third subtracter means 48 is supplied to the second adder 44 via the incomplete derivative means 50. The second adder means 44 adds the outputs of the first 1st lag means 42 and that of the incomplete derivative means 50, thus obtaining a sum. This sum is input to the first adder mean 36, to which the output of the gain-coefficient multiplying means 34, i.e., $\alpha$ SV, is supplied. Hence, the first adder means 36 outputs the sum of the outputs of the gain-coefficient multiplying means 34 and the second adder means 44. As a result of this, two degrees of freedom are imparted to the derivative time.

It will now be explained how to impart two degrees of freedom to the integral time. The output of the first subtracter means 38, i.e., SV$-\alpha$ SV, is supplied to the second 1st lag means 52 which contains the 2DOF coefficient $\beta$ of an integral time. The output of the means 52 is input to the first adder means 36 through the second subtracter means 40, the first 1st lag means 42, and the second adder means 44. The first adder means 36 adds the outputs of the multiplying means 34 and the second adder means 44, producing an output $SV_0$, which is the output of the setpoint filter means 20.

The reason why the setpoint filter means 20, descried above, is employed will now be explained, with reference to FIGS. 3A, 3B, 4A, 4B, and 5.

The lead/lag means 1 used in the conventional 2DOF PID controller (FIG. 1) and schematically shown in FIG. 3A may be equivalently converted to one illustrated in FIG. 3B. That is, the means 1 can be represented by $(1 + \alpha T_I s)/(1 + T_I s)$, which can be transformed to:

$$\begin{aligned}(1 + \alpha T_I s)/(1 + T_I s) &= (\alpha + \alpha T_I s + 1 - \alpha)/(1 + T_I s) \\ &= \alpha + (1 - \alpha)/(1 + T_I s)\end{aligned} \quad (5)$$

Therefore, equation (5) may be represented by a function block diagram shown in FIG. 3B.

The incomplete integral means 5 used in the conventional PID controller (FIG. 1) and schematically shown in FIG. 4A may be equivalently converted to one illustrated in FIG. 4B. That is, the means 5 can be represented by $(T_I s)/(1 + T_I s)$, which can be transformed to:

$$T_I s/(1 + T_I s) = (1 + T_I s - 1)/(1 + T_I s) \qquad (6)$$
$$= 1 - 1/(1 + T_I s)$$

Therefore, equation (6) may be represented by a function block diagram shown in FIG. 4B.

As is evident from FIGS. 3B and 4B, and also from FIG. 2, the first 1st lag means 42 can be used as both the lead/lag means 1 and the incomplete integral means 5. In other words, the setpoint filter means 20 shown in FIG. 2 has been designed by using the function blocks of FIGS. 3B and 4B and by applying some new technical concept.

The algorithm $C_D(s)$ for controlling process disturbances is given by the equation:

$$C_D(s) = MV/PV \qquad (7)$$
$$= K_P[1 + 1/(T_I s) + T_D s/(1 + \eta T_D s)]$$

On the other hand, the algorithm $C_{SV}(s)$ for controlling the setpoint value is given by the equation:

$$C_{SV}(s) = MV/SV \qquad (8)$$
$$= K_P\{\alpha + [1/(T_I s) - (1 - \alpha)\beta/(1 + \beta T_I s)] + \alpha \gamma T_D s/(1 + \eta T_D s)\}$$

As is clearly understood from equations (7) and (8), when the 2DOF coefficient $\alpha$ of the proportional gain is altered, the proportional gain $K_P \alpha$ of the algorithm for controlling the setpoint value can be changed, while maintaining the proportional gain $K_P$ for the algorithm for controlling the process disturbances. Also, when the 2DOF coefficient $\beta$ of the integral time is altered, the integral time of the algorithm for controlling the setpoint value can be changed, while maintaining the integral time of the algorithm for controlling the process disturbances. Also, when the 2DOF coefficient $\gamma$ of the derivative time is changed, the derivative time of the algorithm for controlling the setpoint value can be changed, while maintaining the derivative time of algorithm for controlling the process disturbances. In brief, a complete 2DOF PID control can be accomplished.

Figure 1:
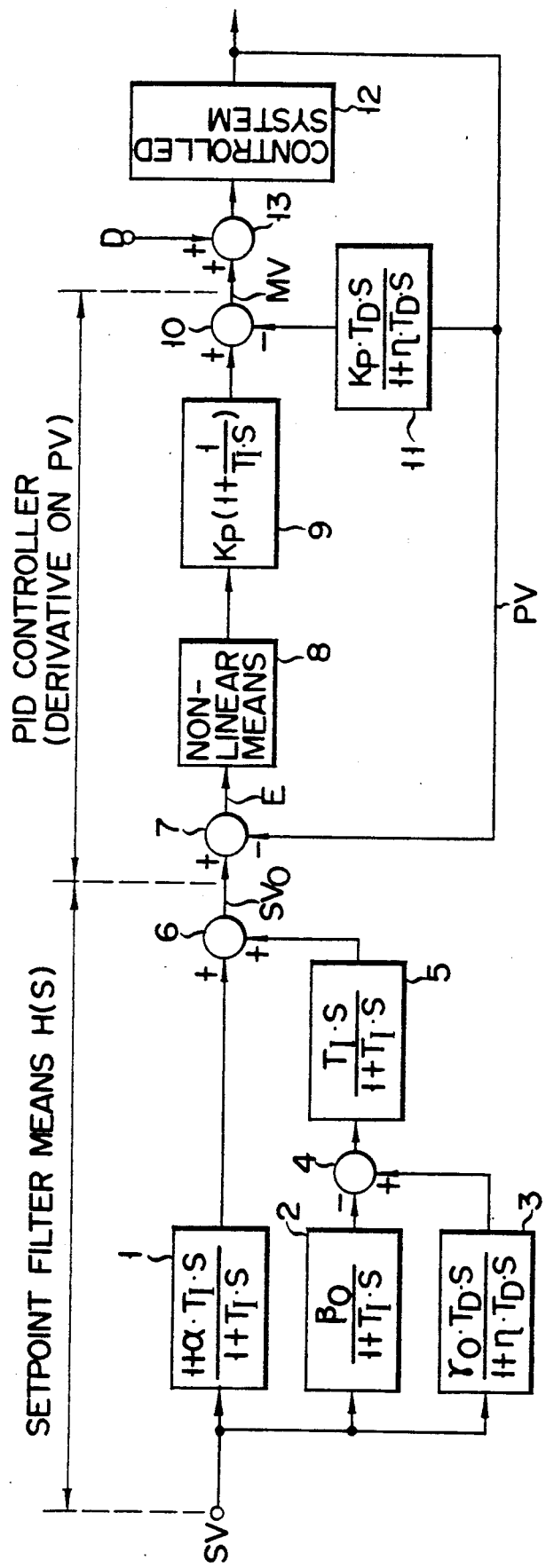
FIG. 1 is a block diagram showing a conventional two degree of freedom PID controller.

Therefore, the 2DOF PID controller shown in FIG. 2 requires only three time means, whereas the 2DOF conventional PID controller shown in FIG. 1 needs to have five time means. Hence, the cost and the load on the PID controller of FIG. 2 is reduced in comparison with that on the conventional PID controller shown in FIG. 1, and the PID controller of FIG. 2 can be lower in capacitance than, and can operate faster than, the conventional PID controller shown in FIG. 1. The controller shown in FIG. 2 can yet perform a complete 2DOF PID control on the system 26.

In the 2DOF PID controller shown in FIG. 2, the 2DOF coefficient $\alpha$ of proportional gain, the 2DOF coefficient $\beta$ of integral time, and the 2DOF coefficient $\gamma$ of derivative time can be set independently of one another. This renders it very easy to set these coefficients.

Furthermore, with the 2DOF PID controller shown in FIG. 2 it is easy to adjust 2DOF coefficients $\beta$ and $\gamma$.

This is because these 2DOF coefficients are automatically adjusted when the 2DOF coefficient $\alpha$ is altered, as is understood from equation (8).

Still further, the 2DOF PID controller shown in FIG. 2 can perform non-linear operations with ease and accuracy. This is because the 2DOF PID controller requires no components equivalent to the incomplete derivative means 11 (FIG. 1) which is bypassed to the output of the PI-control operation means 9 (FIG. 1) and derivative term of the control value is incorporated in the setpoint filter means 20.

Figure 5:
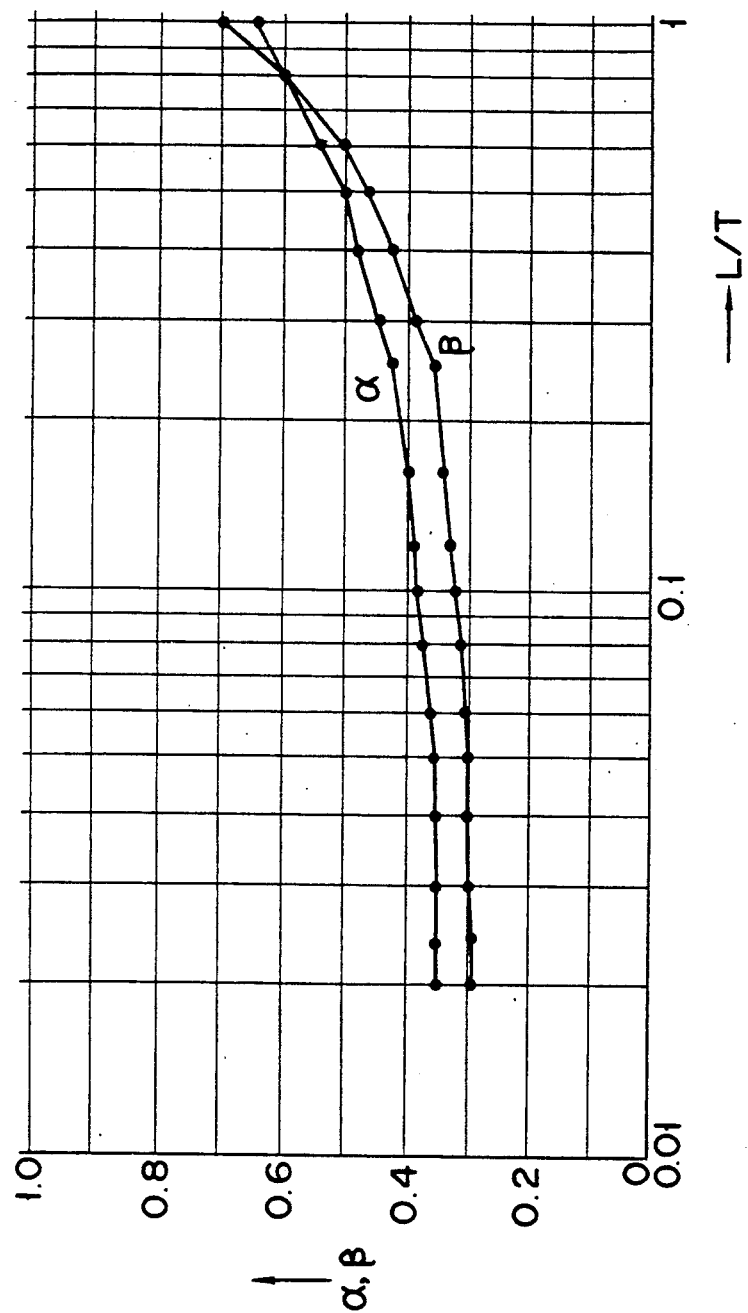
FIG. 5 is a graph representing the relationship between 2DOF coefficients $\alpha$ and $\beta$ on the one hand, and the characteristic of a system controlled by the PID controller shown in FIG. 2.

FIG. 5 represents how the optimal values for the 2DOF coefficients $\alpha$ and $\beta$ changes along with the characteristic of the system 26 being controlled by the 2DOF PID controller shown in FIG. 2. The characteristic of the system 26 is defined by L/T, where L is the idling time of the system 26 and T is the time constant of the system 26. As can be understood from FIG. 5, both 2DOF coefficients $\alpha$ and $\beta$ can be only half set values for practical use of the PID controller shown in FIG. 2. In practice, it is recommended that the 2DOF coefficients $\alpha$, $\beta$, and $\gamma$ be of the following values:

$$\alpha = 0, \beta = 4, \gamma = 1.25$$

The PID controller according to the first embodiment of the invention can serve to advance the fundamentals of plant-controlling PID systems, from the generation of one degree of freedom to the generation of two degrees of freedom, thereby greatly contributing to various fields of industry.

Figure 6:
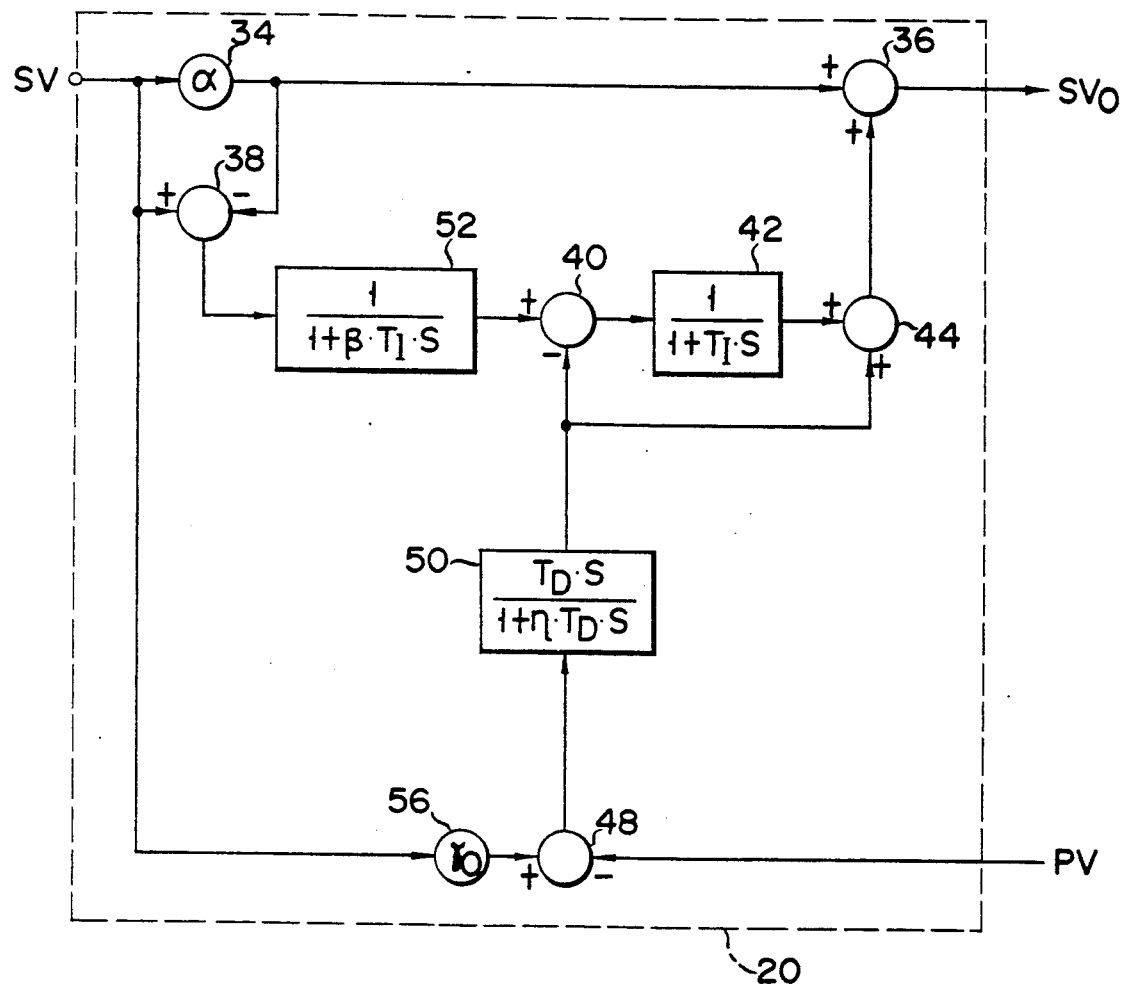
FIG. 6 is a block diagram illustrating a PID controller according to a second embodiment of the present invention.

With reference to FIG. 6, the setpoint filter means 20 of a 2DOF PIP controller according to a second embodiment of the invention will be now described.

In the first embodiment (FIG. 2), the output of the gain coefficient multiplying means 34 is multiplied by the 2DOF coefficient $\gamma$ of derivative time. In the second embodiment shown in FIG. 6, the setpoint value SV is input to a time coefficient multiplying means 56 to which a 2DOF coefficient $\gamma_0$ has been set. Except for this point, the setpoint filter means 20 shown in FIG. 6 is identical to that illustrated in FIG. 2, and the same components as those shown in FIG. 2 are designated at the same numerals in FIG. 6 and will not described in detail.

The algorithm $C_D(s)$ used in the 2DOF PID controller to control the process disturbances is identical to that used in the first embodiment (FIG. 2), which is defined by equation (7). On the other hand, the algorithm $C_{SV}(s)$ used in the 2DOF PID controller to control the $$C_{SV}(s) = MV/SV \qquad (9)$$
$$= K_P\{\alpha + [1/(T_I s) - (1 - \alpha)\beta/(1 + \beta T_I s)] + \gamma_0 T_D s/(1 + \eta T_D s)\}$$

In the embodiment when 2DOF coefficient $\alpha$ is altered, the gain of the derivative term is not automatically changed, which is different from the first embodiment.

With reference to FIG. 7, a 2DOF PI controller according to a third embodiment of the invention will be now described. The third embodiment is identical to the 2DOF PID controller illustrated in FIG. 2, except that its setpoint filter means 120 has no derivative terms at all. Hence, the same components as those shown in FIG. 2 are designated at the same numerals in FIG. 7 and will not described in detail.

As is shown in FIG. 7, the setpoint filter 120 comprises a 2DOF coefficient multiplying means 34 for multiplying a setpoint value SV by a 2DOF coefficient of a proportional gain, a subtracter means 38 for subtracting the output of the means 34 from the setpoint value SV, two 1st lag means 52 and 42 connected in series for imparting an appropriate 1st lag to the output of the subtracter means 38, and an adder means 36 for adding the output of the 2DOF coefficient multiplying means 34 to the output of the 1st lag means 42. The output of the adder means 36 is input to a PI deviation calculating means 28 as the setpoint value $SV_0$ therefor.

The setpoint filter means 120 receives the setpoint value SV, and performs two degree of freedom operations on a proportional gain and an integral time on the basis of the setpoint value SV, thereby producing a setpoint value $SV_0$ required for a one degree of freedom (1DOF) control. The setpoint value $SV_0$ is input to a deviation-calculating means 28, to which a control value PV is input from a controlled system 26. The means 28 subtracts the control value PV from the setpoint value $SV_0$, obtaining a deviation E. The deviation E is supplied to the PI control means 32. The PI control means 32 performs a PI control operation on the deviation E, generating a manipulative variable MV. The manipulative variable MV, thus obtained, is input to an adder means 24, to which a process disturbance signal D is supplied. The adder means 24 adds the variable MV and the signal D, thereby generating a sum signal. The sum signal is supplied to the system 26. As a result, the system 26 is controlled such that $SV = SV_0 = PV$.

The operation of the 2DOF PI controller shown in FIG. 7 will now be explained, with reference to FIGS. 8 and 9.

Figure 8:
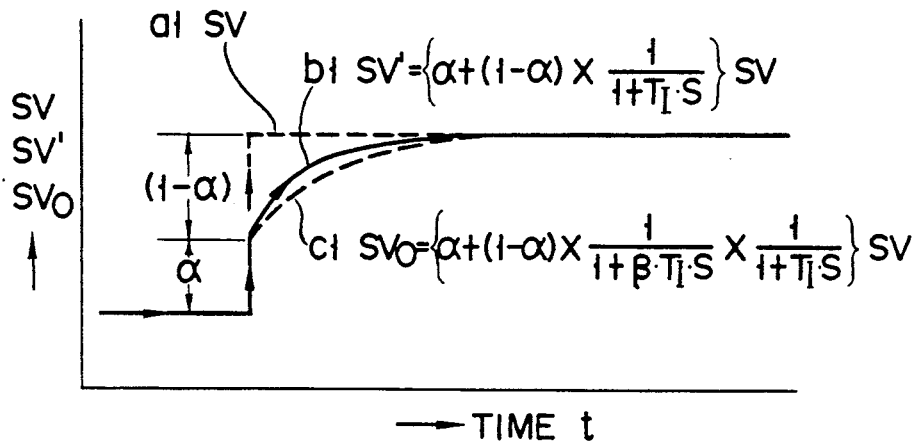
FIG. 8 is a graph explaining how a setpoint filter responds to a stepwise change of a setpoint value.

When the setpoint value SV changes stepwise as is indicted by a line a1 shown in FIG. 8, the equivalent circuit shown in FIG. 3B generates an output SV, represented by a line b1, due to the transfer function defined by equation (5). The output characteristic represented by the line b1 first changes in proportion to the coefficient $\alpha$, and the term $(1 - \alpha)$ keeps changing in accordance with $1/(1 + T_I s)$. Therefore, the output characteristic will change to one represented by a line c1 if the 1st lag means 62 is added to the term $(1 - \alpha)$, in the case where the response characteristic, defined by the line b1, has a great over-shoot. This output characteristic represented by the line c1 has an overshoot smaller than that of the response characteristic defined by the line b1.

It will now be explained how the setpoint filter means 120 and the PI control means 32 cooperate, thereby accomplishing a complete 2DOF PI control.

As can be understood from FIG. 7, the algorithm $C_D(s)$ for controlling process disturbances is:

$$C_D(s) = MV/PV = C(s) = K_P\{1 + 1/(T_I s)\} \quad (10)$$

As is seen from FIG. 7, too, the algorithm $C_{SV}$ for controlling the setpoint value is:

$$\begin{aligned}
C_{SV}(s) &= F(s)\, C(s) \quad (11)\\
&= \{\alpha + (1-\alpha)/[(1+\beta T_I s)(1+T_I s)]\} \times \\
&\quad K_P\{1 + 1/(T_I s)\} \\
&= K_P\{\alpha[1 + 1/(T_I s)] + \\
&\quad (1-\alpha)/[(T_I s)(1+\beta T_I s)]\} \\
&= K_P\{\alpha[1 + 1/(T_I s)] + \\
&\quad (1-\alpha) \times [1/(T_I s) - \beta/(1+\beta T_I s)]\}
\end{aligned}$$

-continued
$$= K_P\{\alpha + [1/(T_I s) - (1-\alpha)\beta/(1+\beta T_I s)]\}$$

As is evident from equations (10) and (11), the proportional gain $\alpha K_P$ for the setpoint value can be changed by altering the 2DOF coefficient $\alpha$, while maintaining the proportional gain $K_P$ for the process disturbances, once $K_P$ and $T_I$ have been set at such values that the 2DOF PI controller (FIG. 7) has an optimal process-disturbance controlling characteristic. Further, the integral time $\beta T_I$ for the setpoint value can be changed by altering the 2DOF coefficient $\beta$, while maintaining the integral time $T_I$ for the process disturbances, once $K_P$ and $T_I$ have been set at such values that the 2DOF PI controller (FIG. 7) has an optimal process-disturbance controlling characteristic. Thus, the 2DOF PI controller illustrated in FIG. 7 can perform a complete 2DOF PI control.

Therefore, an integral term $I_{SV}(s)$ for the setpoint value is given by the following equation:

$$I_{SV} = 1/(T_I s) - (1-\alpha)/(1+T_I s) \quad (12)$$

From equation (12), we obtain:

(a) When $\beta = 0$, $I_{SV}(s) = 1/(T_I s)$ (the integral time not changed)
(b) When $\beta > 0$, $ISV(s) < 1/(T_I s)$ (the integral time made longer)
(c) When $\beta < 0$, $I_{SV}(s) > 1/(T_I s)$ (the integral time made shorter)

Obviously, the integral time $\beta T_I$ for the process disturbances can be equivalently changed, while maintaining the integral time $T_I$, merely by changing the 2DOF coefficient $\beta$ of the integral time $T_I$.

Figure 9:
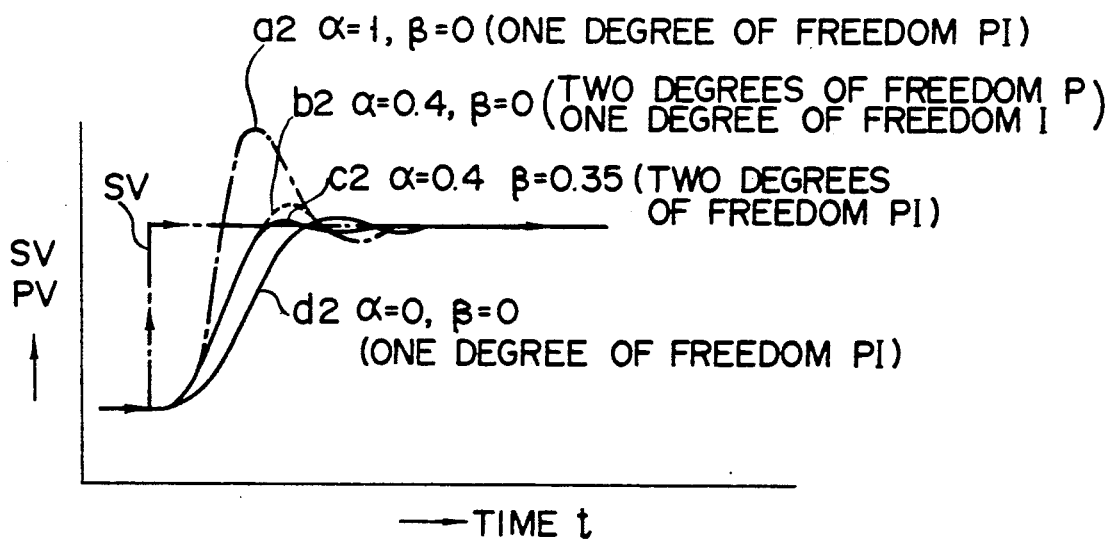
FIG. 9 is a graph explaining the setpoint-following characteristic which the PI controller shown in FIG. 7 has when its process-disturbance control characteristic is tuned.

Hence, the 2DOF PI controller shown in FIG. 7 will have the response characteristic shown in FIG. 9 if the transfer function $G(s)$ of the system 26 is set at $e^{-2s}/(1+5s)$ and the setpoint value SV is changed $e^{-2s}/(1+5s)$ and the setpoint value SV is changed stepwise by adjusting the PI parameters so as to achieve an optimal control of process disturbances. The curve a2 shown in FIG. 9 represents the response characteristic which the 2DOF PI controller would exhibit if $\alpha = 1$ and $\beta = 0$, that is, if it had no setpoint filter means 120 and hence achieved a one degree of freedom PI control. As is clearly seen from the curve a2, this response characteristic has a great overshoot.

The curve b2 shown in FIG. 9 represents the response characteristic which the 2DOF PI controller would exhibit if $\alpha = 0.4$ and $\beta = 0$, that is, if it achieved a two degree of freedom control on P only. The response characteristic represented by the curve b2 also has an overshoot, though not so great as that represented by the curve a2.

The curve c2 represents the response characteristic which the 2DOF PI controller does exhibit when $\alpha = 0.4$ and $\beta = 0.35$, that is, when it achieves a two degree of freedom control on both P and I. As is evident from the curve c2, this response characteristic has a very small overshoot.

Further, the curve d2 shown in FIG. 9 represents the response characteristic the 2DOF PI controller would exhibit if $\alpha = 0$ and $\beta = 0$, that is, if it achieved a one degree of freedom control on both P and I. Obviously, this response characteristic is insufficient; the 2DOF PI controller would respond too slowly to the changes in the setpoint value SV. As can be understood from FIG. 9, the 2DOF PI controller illustrated in FIG. 7 can accomplish an optimal two degree of freedom control on both P and I.

Also, as is evident from equation (11), the integral time equivalently changes in an appropriate direction when the 2DOF coefficient α of the proportional gain is varied. More precisely, the greater the coefficient α, the shorter the integral time, and the less the coefficient α, the longer the integral time. In other words, the integral time changes in the different direction from the response speed of the 2DOF PI controller. When the coefficient α is fixed, the integral time can be changed by varying the coefficient β only.

As is apparent from FIG. 7, the setpoint filter means 120 comprises only two 1st lag means 42 and 52 and can yet reliably performs a two degree of freedom control of the system 26. The setpoint filter means 120 is simple in structure. Hence, the load on the 2DOF PI controller is less than that o the conventional PID controller shown in FIG. 1, and the PI controller can operate faster than the conventional PID controller. A 2DOF PI system for controlling a plant, which comprises several tens to several thousands of 2DOF PI controllers identical to the one illustrated in FIG. 7 can, therefore, be small, have a relatively small load and operate at high speed.

FIGS. 10 to 12 illustrate three setpoint filter means incorporated in two 2DOF PI controllers according to a fourth, a fifth, and a sixth embodiment of the invention, respectively. Each of these setpoint filter means has two 1st lag means.

The setpoint filter means 120 shown in FIG. 10 is characterized in that a 1st lag means 58 and an adder means 60 are connected to the output of a subtracter means 38 which subtracts the output of a coefficient multiplying means 34 from the setpoint value SV. The adder means 60 adds the output of the subtracter means 38 and that of the 1st lag means 58, thus producing a sum. This sum is input to a 1st lag means 42. The output of the 1st lag means 42 is supplied to a subtracter means 62, to which the output of the 1st lag means 62 is supplied. Hence, the subtracter means 62 subtracts the output of the 1st lag means 42 from that of the 1st lag means 58, thus obtaining a difference. This difference is input to an adder means 36.

The algorithm $C_{SV}(s)$ used in the setpoint filter means 120 of FIG. 10 for controlling the setpoint value SV is defined by the following equation:

$$C_{SV}(s) = K_p\{\alpha + 1/(T_I s) - (1-\alpha)\beta/(1+T_I s)\} \quad (13)$$

Obviously, the two 1st lag means 42 and 58 serve to accomplish a two degree of freedom PI control.

The setpoint filter means 120 illustrated in FIG. 11 has also two 1st lag means 42 and 52. It is characterized in that a subtracter means 64 is connected to the output of a subtracter means 38 which subtracts the output of a coefficient multiplying means 34 from the setpoint value SV. The subtracter means 64 subtracts the output of the 1st lag means 52 from the output of the subtracter means 38, said output of the means 52 having been obtained by delaying the setpoint value SV. The signal output by the subtracter means 64 is input to the 1st lag means 42.

The algorithm $C_{SV}(s)$ used in the setpoint filter means 120 of FIG. 11 for controlling the setpoint value SV is defined by the following equation:

$$C_{SV}(s) = K_p\{\alpha + [1/(T_I s) - \beta/(1+\beta T_I s)]\} \quad (14)$$

FIG. 12 shows a modification of the setpoint filter means 120 illustrated in FIG. 10. This modification is different from the means 120 in that the setpoint value SV, not the output of the subtracter means 38, is input to the 1st lag means 58. The algorithm $C_{SV}(s)$ applied in the modification is:

$$C_{SV}(s) = K_p\{\alpha + [1/(T_I s) - \beta/(1+T_I s)]\} \quad (14)$$

Hence, the 2DOF PID controller according to the sixth embodiment of the invention, which has the setpoint filter means shown in FIG. 12, can perform a two degree of freedom control.

The 2DOF PID controller according to a seventh embodiment of the present invention will now be described with reference to FIG. 13. The same components as those shown in FIG. 2 are designated at the same numerals in FIG. 13 and will not be described in detail.

The 2DOF PID controller shown in FIG. 13 is identical to that of FIG. 2, except that no components equivalent to the 1st lag means 52 are used, and that components 70, 72 and 74 are used in place of incomplete derivative means 50. In other words, this 2DOF PID controller comprises a setpoint filter means 220, a PI algorithm executing means 22, and an adder means 24. A system 26, which this 2DOF PID controller is to control, is connected to the output of the adder means 24.

The setpoint filter means 220 receives a setpoint value and perform operations, thereby imparting two degrees of freedom to a proportional gain Kp and a derivative time $T_D$.

The PI algorithm executing means 22 comprises a deviation-calculating means 28, a non-linear means 30, and a PI control means 32. The deviation-calculating means 28 receives an output $SV_0$ of the setpoint filter means 20 and also the control value PV supplied from the controlled system 26, and subtracts the control value PV from the output $SV_0$, thereby obtaining a deviation E; it performs the subtraction of $SV_0 - PV = E$. The non-linear means 30 performs a non-linear operation on the deviation E, thus producing an output. The PI control means 32 performs a PI-control operation on the output of the non-linear means 30, thereby generating a manipulative variable MV.

The adder means 24 is designed to add a process disturbance signal D to the manipulative variable MV generated by the PI-algorithm executing section 22, thereby outputting the sum to the controlled system 26. As a result, the system 26 is controlled such that $SV = SV_0 = PV$.

As mentioned above, the setpoint filter means 220 imparts two degrees of freedom to the proportional gain and the derivative time. To this end, the derivative term of the incomplete derivative means 11 (FIG. 1), which is bypassed to the output of the PI-control operation means 9, is supplied to the setpoint filter means 220.

First it will be explained how the means 220 imparts two degrees of freedom to the proportional gain. The gain-coefficient multiplier 34 multiplies the setpoint value SV by the 2DOF coefficient α of the proportional gain. The output of the multiplier 34, i.e., the product of SV and α, is supplied to the first adder means 36 and also to the first subtracter means 38. The first subtracter means 38 subtracts the output SV from the setpoint value SV. The output of the first subtracter means 38, i.e., the difference between SV and α SV, is input to the first adder means 36 through the second subtracter means 40, the second 1st lag means 42, and the second adder means 44. The first adder means 36 adds the output of the second adder means 44 to the output of the gain-coefficient multiplying means 34, thus imparting two degrees of freedom to the proportional gain.

It will now be explained how the means 220 imparts two degrees of freedom to the derivative time. The output of the gain-coefficient multiplying means 34 is input to the time-coefficient multiplying means 46 in which the 2DOF coefficient γ of derivative time is set to the means 46. The time-coefficient multiplying means 46 multiplies the output of the means 34 by the coefficient γ, obtaining a product α γ SV. This product is input to the third subtracter means 48. The third subtracter 48 subtracts the control value PV of the system 26 from the product α γ SV, thus obtaining the difference, α γ SV−PV. This difference is supplied to the divider means 70. The output of the divider means 70 is directly input to the fourth subtracter means 74. It is also input to the fourth subtracter means 74 through the third 1st lag means 72. The fourth subtracter means 74 subtracts the output of the third 1st lag means 72 from the output of the divider means 70. The output of the fourth subtracter means 74 is input directly to the second adder means 44. It is also input to the second adder means 44 through the second subtracter means 40 and the first 1st lag means 42. The second adder means 44 adds the outputs of the first 1st lag means 42 and that of the fourth subtracter means 74, thus obtaining a sum. This sum is input to the first adder means 36, to which the output of the gain-coefficient multiplying means 34, i.e., α SV, is supplied. Hence, the first adder means 36 outputs the sum of the outputs of the gain-coefficient multiplying means 34 and the second adder means 44. Thus sum, i.e., the output $SV_0$ of the setpoint filter means 220, is input to the deviation-calculating means 28 of the PI algorithm executing section 22.

The incomplete derivative means 50 incorporated in the first embodiment shown in FIG. 2 is equivalently represented as $(T_D s)/(1+\eta T_D s)$ as is shown in FIG. 14A. This algebraic notation can be changed to the following:

$$T_D s/(1 + \eta T_D s) = (1/\eta)\eta T_D s/(1 + \eta T_D s) \quad (16)$$
$$= (1/\eta)[1 - T_D s/(1 + \eta T_D s)]$$

Equation (16) can be represented by the functional block diagram of FIG. 14B. Therefore, the incomplete derivative means 50 is equivalent to a combination of the divider means 70, the third 1st lag means 72, and the fourth subtracter means 74—all shown in FIG. 13. It follows that the algorithm $C_D(s)$ for controlling process disturbances is given by the following equation:

$$C_D(s) = MV/PV \quad (17)$$
$$= C(s) + [T_D s/(1 + \eta T_D s)] \times [(T_I s)/(1 + T_I s)]C(s)$$
$$= K_P[1 + 1/(T_I s)] + [T_D s/(1 + \eta T_D s)] \times [T_I s/(1 + T_I s)] \times K_P[1 + 1/(T_I s)]$$
$$= K_P[1 + 1/(T_I s) + T_D s/(1 + \eta T_D s)]$$

On the other hand, the algorithm $C_{SV}(s)$ for controlling the setpoint value SV is defined as follows:

$$C_{SV}(s) = MV/SV \quad (18)$$

-continued
$$= [(1 + \alpha T_I s)/(1 + T_I s)]C(s) + [\alpha\gamma T_D s/(1 + \eta T_D s)] \times [T_I s/(1 + T_I s)]C(s)$$
$$= [(1 + \alpha T_I s)/(1 + T_I s)]K_P[1 + 1/(T_I s)] + [\alpha\gamma T_D s/(1 + \eta T_D s)] \times [T_I s/(1 + T_I s)]K_P[1 + 1/(T_I s)]$$

As is evident from equations (17) and (18), the proportional gain α Kp for the setpoint value can be changed by altering the 2DOF coefficient α, while maintaining the proportional gain Kp for the process disturbances. On the other hand, the derivative time of the algorithm for controlling the setpoint value SV can be changed by altering the 2DOF coefficient γ of derivative time, while maintaining the derivative time of the algorithm for controlling the process disturbances. In short, the 2DOF PID controller shown in FIG. 13 can perform complete two degree of freedom control on both P and D.

Hence, the 2DOF PID controller shown in FIG. 13 requires only two time means, whereas the conventional 2DOF PID controller needs to have four time means It can therefore be manufactured at a lower cost, be small, have a relatively small, load and operate at high speed.

Moreover, with the 2DOF PID controller shown in FIG. 13 it is easy to set the 2DOF coefficient α of proportional gain and the 2DOF coefficient γ of derivative time, since these 2DOF coefficients can be set independently of each other. In addition, it is easy to adjust these 2DOF coefficients since the gain of the derivative term is automatically adjusted when the 2DOF coefficient α of proportional gain is changed.

Further, derivative components can reliably undergo non-linear operations in the 2DOF PID controller. This is because the controller has no components equivalent to the incomplete derivative means 11 (FIG. 1) by-passed to the output of the PI-control operation means 9, and the derivative terms of the control value PV are input to the setpoint filter means 220.

Figure 15:
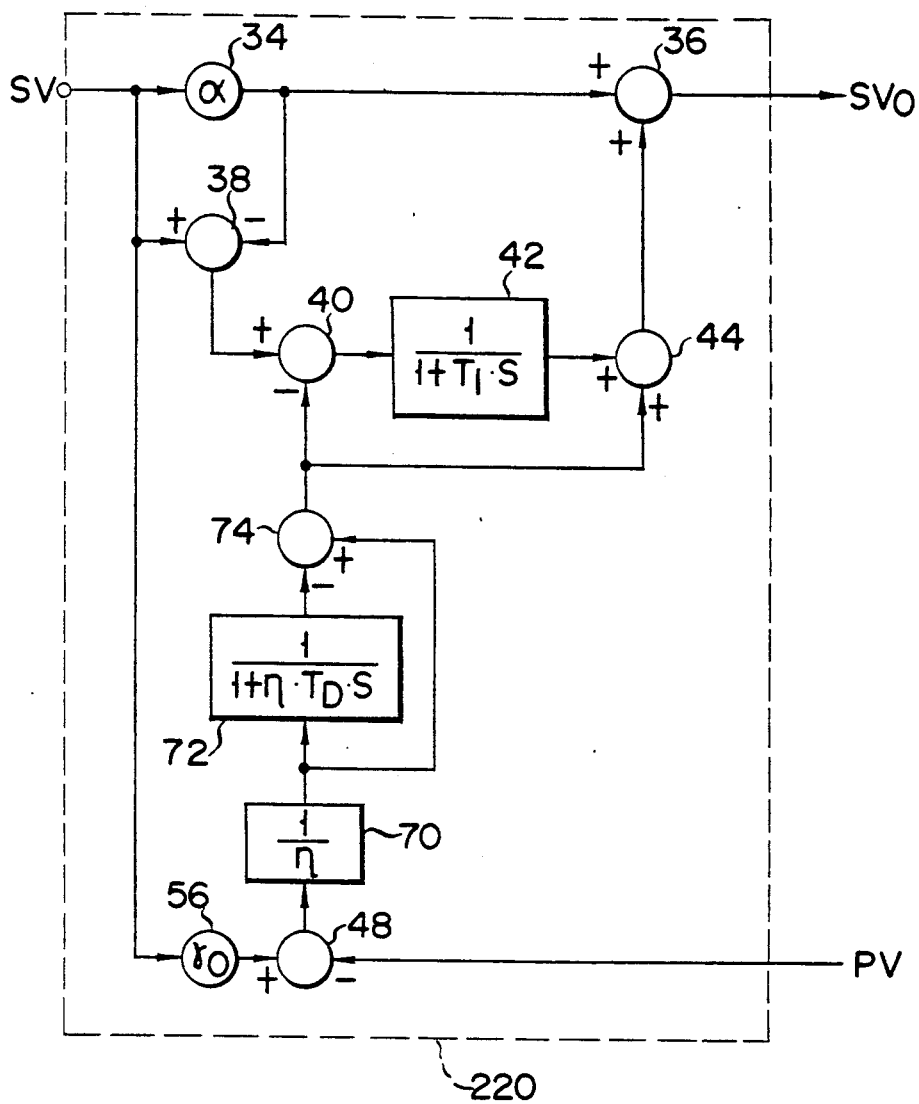
FIG. 15 is a block diagram showing a PID controller according to an eighth embodiment of the present invention.

With reference to FIG. 15, the setpoint filter means 220 incorporated in a 2DOF PID controller according to an eighth embodiment of the invention will now be described. This setpoint filter means 220 is different from the setpoint filter means 20 shown in FIG. 6 in two respects. First, it has no components equivalent to the 1st lag means 52. Secondly, it has a divider means 70, a 1st lag means 72, and a subtracter means 74—identical to those used in the seventh embodiment (FIG. 13)—in place of the incomplete derivative means 50 used incorporated in the setpoint filter means 20 (FIG. 6).

Therefore, the algorithm $C_D(s)$ applied to the eighth embodiment for controlling process disturbances is represented by equation (17), and the algorithm $C_{SV}(s)$ for controlling the setpoint value SV is defined by the following equation:

$$C_{SV}(s) = MV/SV \quad (19)$$
$$= K_P\{\alpha + \gamma T_D s/(1 + \eta T_D s)\} + K_P/(T_I s)$$

As clearly understood from equation (19), the gain of the derivative term cannot be automatically adjusted when the 2DOF coefficient α of proportional gain is changed. In this respect, the setpoint filter means 220 of FIG. 15 is different from the setpoint filter means (FIG. 13) of the seventh embodiment of the invention.

Figure 17:
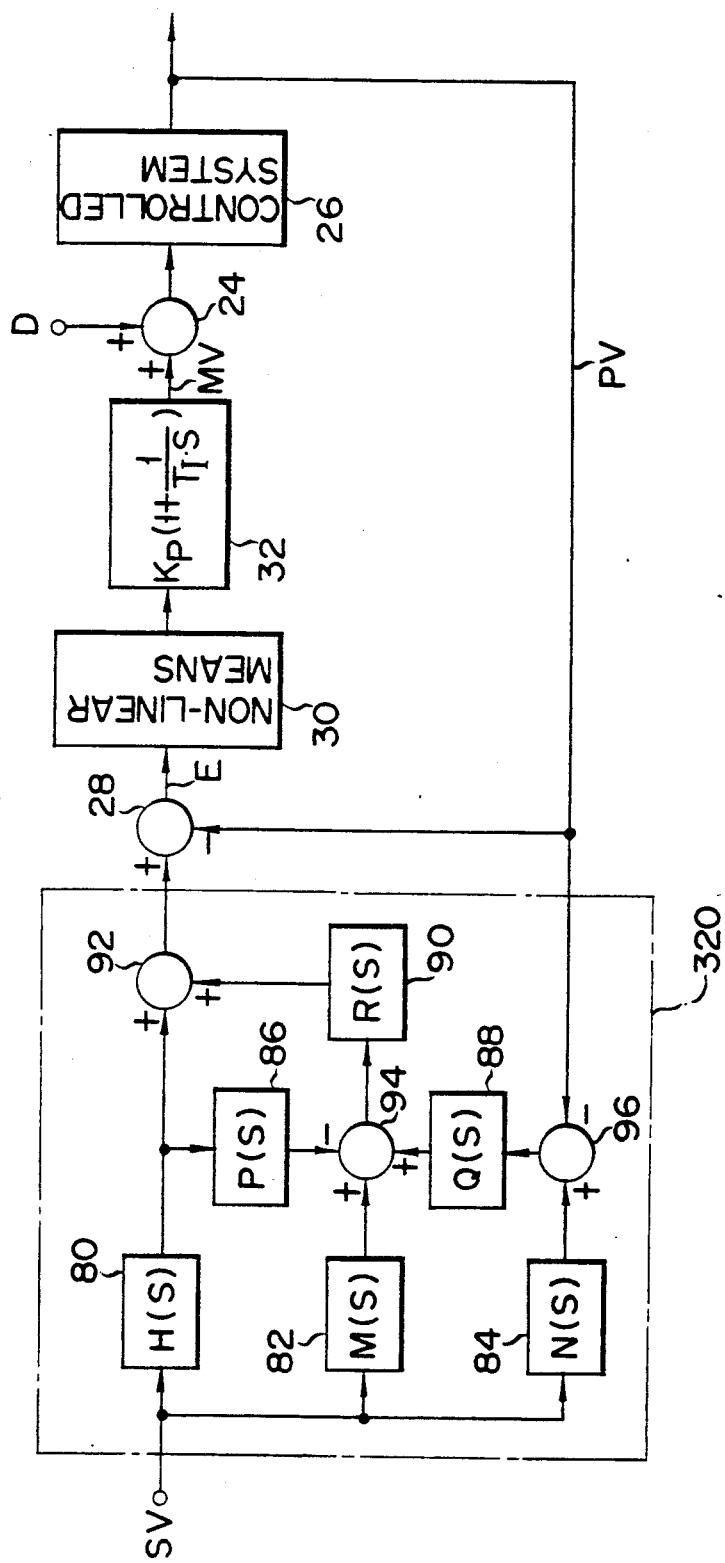
FIG. 17 is a block diagram showing an assumed structure of the setpoint filter means incorporated in the PID controller illustrated in FIG. 16.
Figure 18:
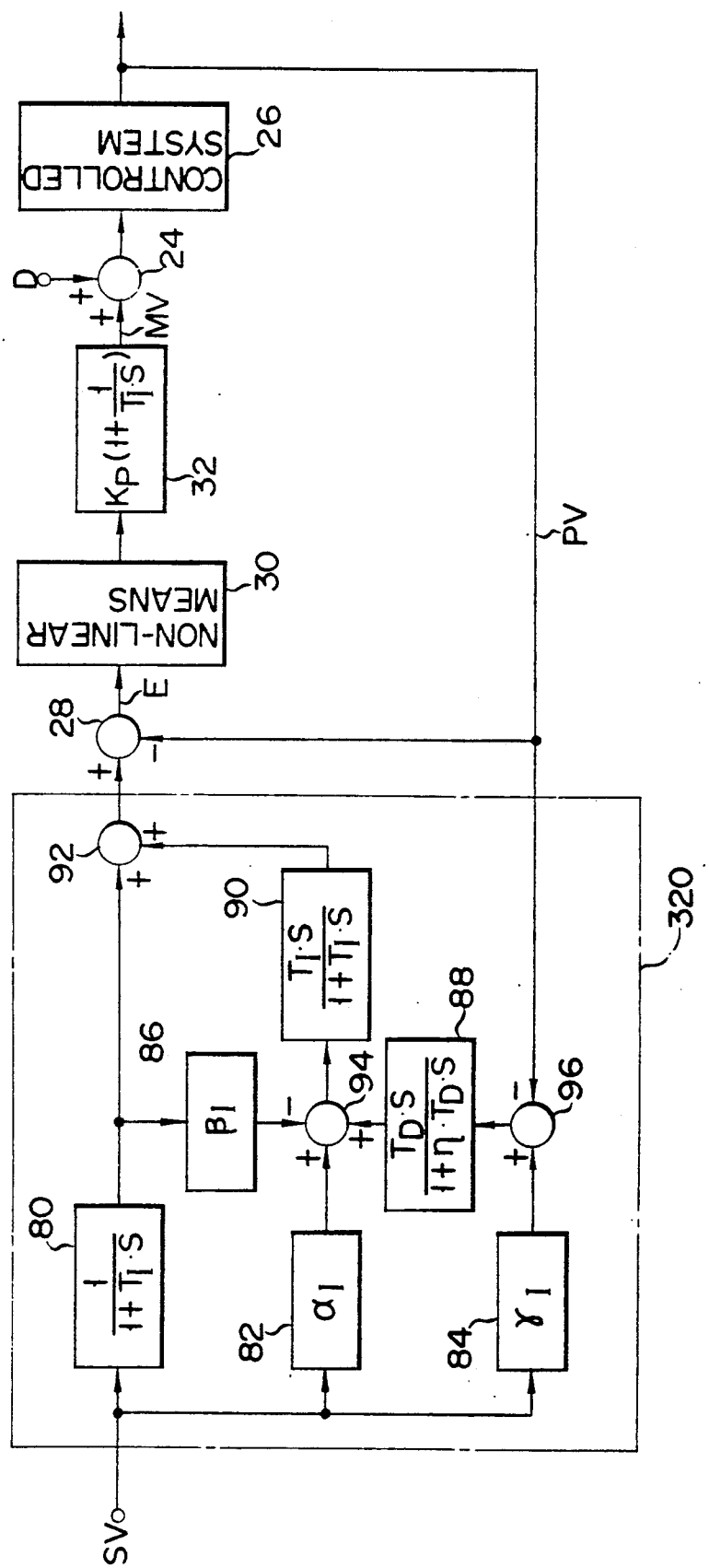
FIG. 18 is a block diagram showing the actual structure of the setpoint filter means used in the PID controller illustrated in FIG. 16.
Figure 19:
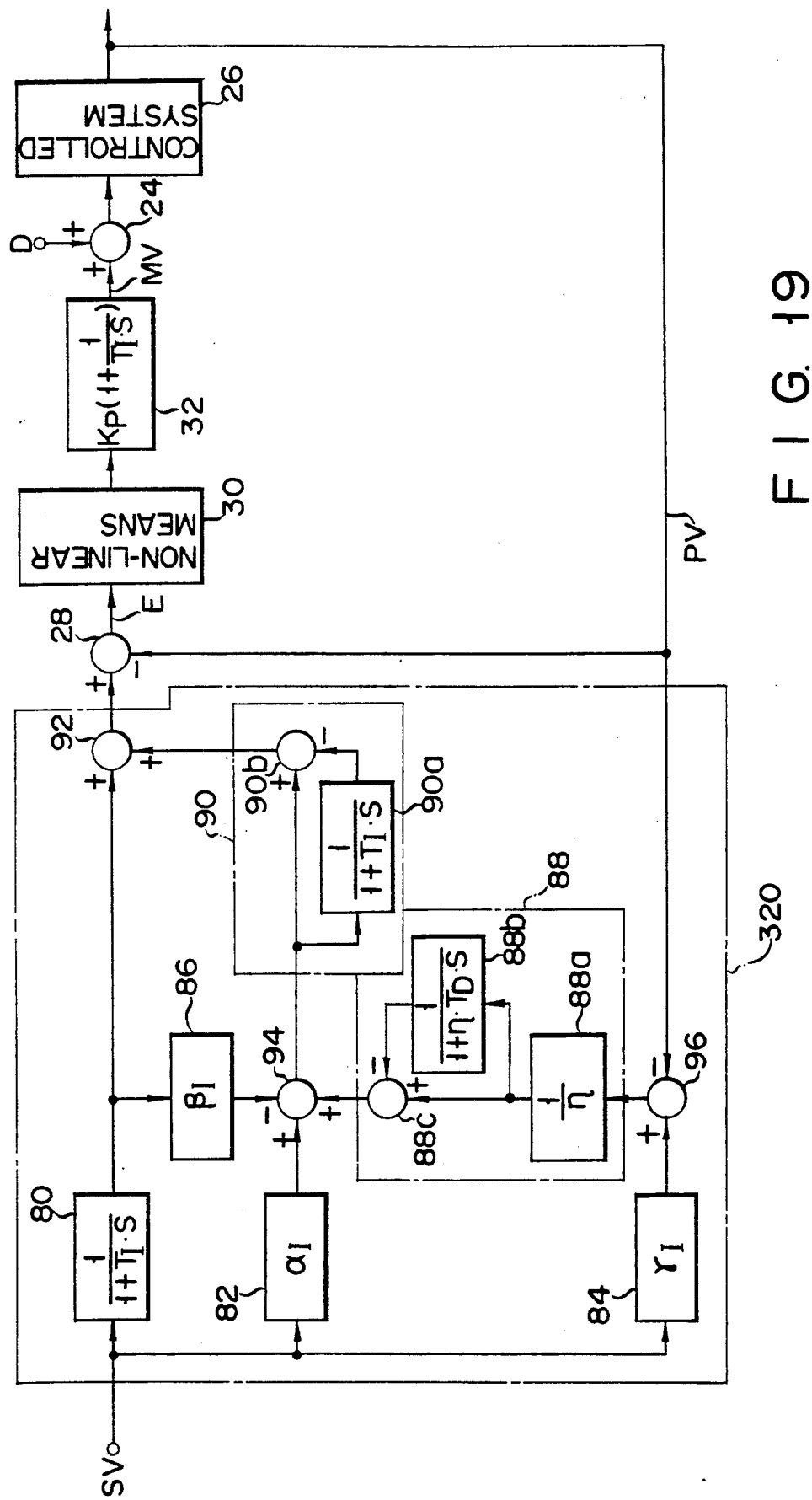
FIG. 19 is a block diagram showing a setpoint filter means made of 1st lag means only, which can be used in the PID controller shown in FIG. 16.

A 2DOF PID controller according to a ninth embodiment will now be described, with reference to FIGS. 16 to 19. FIG. 16 is a block diagram illustrating the 2DOF PID controller; FIG. 17 is a block diagram showing an assumed structure of the setpoint filter means 320 incorporated in the PID controller shown in FIG. 16; FIG. 18 is a block diagram showing the actual structure of the setpoint filter means 320; and FIG. 19 is a block diagram showing a modification of the means 320, which comprises 1st lag means only.

The basic structure of the ninth embodiment will be described, with reference to FIG. 16. As is shown in FIG. 16, the 2DOF PID controller comprises a setpoint filter means 320, a PI-algorithm executing section 22 coupled to the output of the filter means 320, and an adder means 24 connected to the output of the section 22. A system 26, which is controlled by the PID controller, is connected to the output of the adder means 24. The PI-algorithm executing section 22 comprises a deviation-calculating means 28, a non-linear means 30 connected to the output of the means 28, and a PI control means 32 connected to the output of the non-linear means 30.

The setpoint filter means 320 receives a setpoint value SV and a control value PV, and performs a derivative operation and a 2DOF operation on the control value PV, thereby producing a setpoint value $SV_0$. The setpoint value $SV_0$ is supplied to the PI-algorithm executing section 22; more precisely, it is input to the deviation-calculating means 28. The means 28 subtracts the control value PV from the setpoint value $SV_0$, thus obtaining a deviation E. The deviation E is input to the non-linear means 30. The non-linear means 30 performs various non-linear operations on the deviation E, thus producing an output. Among the non-linear operations are: dead-band operation, deviation-square operation, gain change operation, and gap operation. The output of the non-linear means 30 is supplied to the PI control means 32. The control means 32 performs a PI-control operation on the output of the non-linear means 30, thereby generating a manipulative variable MV. The adder means 24 adds a process disturbance signal D to the manipulative variable MV generated by the PI-algorithm executing section 22, thereby outputting the sum to the controlled system 26.

The internal structure of the setpoint filter means 320 is so complex that it is difficult to explain it clearly. To describe the internal structure, let us assume that the means 320 comprises transfer functions 80, 82, 84, 86, 88 and 90, an adder means 92, a subtracter means 96, and an adder-subtracter means 94, as is illustrated in FIG. 17.

First, the transfer functions 80, 82, 84, 86, 88, and 90 will be determined. The operation which the PI control means 32 performs is defined by the equation $$C_0(s) = Kp\{1 + 1/(T_I s)\} \tag{20}$$

The response to the control value PV is represented as follows:

$$PV = \{(H(s) + H(s)P(s)R(s) + M(s)R(s) + \tag{21}$$
$$N(s)Q(s)R(s))C_0(s)G(s)/[1 + (1 + Q(s)R(s))C_0(s)G(s)]\}SV +$$
$$\{G(s)/[1 + (1 + Q(s)R(s))C_0(s)G(s)]\}D(s)$$

Equation (21) shows that the control value PV is a combination of SV components and D(s) components. Equation (21) is applied to designate a desired control algorithm which will control the process disturbance optimally in accordance with the changes of the process disturbance D(s). Of the components of the second term of equation (21), the transfer function G(s) of the controlled system 26 and the process disturbance D(s) are known variables. Hence, the algorithm $C_D(s)$ for controlling process disturbances can be designated by using a general PID algorithm which reads:

$$\begin{aligned}C_D(s) &= \{1 + Q(s)R(s)\}C_0(s) \\ &= Kp\{1 + 1/(T_I s) + T_D s/(1 + \eta T_D s)\}\end{aligned} \tag{22}$$

From equations (20), (21), and (22), we obtain:

$$C_0(s)Q(s)R(s)/(1+\eta T_D s) \tag{23}$$

$$Q(s)R(s) = \{(T_D s)/(1+\eta T_D s)\} \times \{(T_I s)/(1+T_I s)\} \tag{24}$$

Further, from equation (24), we obtain the transfer functions 88 and 90 defined as follows:

$$Q(s) = (T_D s)/(1+\eta T_D s) \tag{25}$$

$$R(s) = (T_I s)/(1 T_I s) \tag{26}$$

Next, a control algorithm suitable for imparting the best possible setpoint-following characteristic to the 2DOF PID controller (FIG. 16) will be designated. Of the SV components of the first term of equation (21), G(s) and SV cannot be altered, nor can the algorithm of equation (22) be altered. Therefore, the algorithm $C_{SV}(s)$ for controlling the setpoint value SV can be given by the equation:

$$\begin{aligned}C_{SV}(s) &= \{H(s) + H(s)P(s)R(s) + M(s)R(s) + \\ &\quad N(s)Q(s)R(s)\}C_0(s) \\ &= Kp\{\alpha_1 + [1/(T_I s) - \beta_1/(1 + T_I s)] + \\ &\quad \gamma_1 T_D s/(1 + \eta T_D s)\}\end{aligned} \tag{27}$$

where $\alpha 1$, $\beta 1$, and $\gamma 1$ are 2DOF coefficients, and have the following significances.

(1) Coefficient $\alpha 1$

This is a coefficient for converting the proportional gain Kp required for controlling the process disturbance optimally, into the proportional gain Kp* for imparting the best possible setpoint-following characteristic to the PID controller. The coefficient has the following relationship with Kp and Kp*,:

$$\alpha_1 \cdot Kp = Kp^* \rightarrow \alpha_1 = Kp^*/KP \tag{28}$$

(2) Coefficient $\gamma 1$

This coefficient is used to convert the derivative time $T_D$ required for controlling the process disturbance optimally, into the derivative time $T_D^*$ for imparting the best possible setpoint-following characteristic to the PID controller. The coefficient $\gamma 1$ has the following relationship with Kp, Kp*, TD and TD*:

$$Kp \cdot \gamma_1 \cdot T_D = Kp^* \cdot T_D^* \rightarrow \gamma_1 = \alpha_1 \cdot (T_D^*/T_D) \tag{29}$$

(3) Coefficient $\beta 1$

This is a coefficient for converting the integral time $T_I$ required for controlling the process disturbance optimally, into the integral time $T_I^*$ for imparting the best possible setpoint-following characteristic to the PID controller.

The optimal proportional gain $K_p^*$ can be obtained by multiplying the gain $K_p$ by $\alpha$, and the optimal derivative time $T_D^*$ can be obtained by multiplying the derivative time $T_D$ by $\gamma_1/\alpha_1$.

However, the $T_I^*$, which is required to impart the best possible setpoint-following characteristic to the PID controller, cannot be obtained by multiplying the integral time $T_I$ by the coefficient. To impart two degrees of freedom to the integral time, special measures must be taken, such as the application of an equation similar to equation (23). For example, the integral time $T_I^*$ can be obtained by changing the value for $\beta_1$, and then changing the integral time $T_I$ equivalently. More specifically, the integral term $I^*(s)$ required to impart the best possible setpoint-following characteristic to the PI controller is defined as follows:

$$\begin{aligned} I^*(s) &= I(s) - \text{saturated means} \\ &= I(s) - \beta_1/(1 + T_I s) \\ &= 1/(T_I s) - \beta_1/(1 + T_I s) \end{aligned} \quad (30)$$

Note:
The saturated means corresponds to a 1st lag means and $I(s)$ is an integral term required to impart the best possible process disturbance control.

In equation (30), $\beta_1$ is set at such a value that:
 (a) If $\beta_1=0$, $I^*(s)=I(s)$, whereby the integral time remains unchanged.
 (b) If $\beta_1>0$, $I^*(s)<I(s)$, whereby the integral time equivalently increases.
 (c) If $\beta_1<0$, $I^*(s)>I(s)$, whereby the integral time equivalently decreases.

In other words, the integral time defined by equation (26) is changed in accordance with the selected value for the coefficient $\beta_1$. Equation (23) is applied to equation (27), and the transfer function 84, or $N(s)$, is set to the coefficient $\gamma_1$, that is, $N(s)=\gamma_1$, thereby canceling the derivative terms. As a result of this, we obtain:

$$\{H(s)+H(s)P(s)R(s)+M(s)R(s)\}C_0(s) = K_p\{\alpha_1+[1/(T_I s)-\beta_1/(1+T_I s)]\} \quad (31)$$

When equation (20) is applied to the equation (31), the equation (31) changes to:

$$H(s) + H(s)P(s)R(s) + M(s)R(s) = 1/(1 + T_I s) + \quad (32)$$
$$[-\beta_1/(1 + T_I s)][T_I s/(1 + T_I s)] + \alpha_1 T_I s/(1 + T_I s)$$

From equations (26) and (32), the transfer functions 80, 86, and 82 will be:

$$H(s) = 1/(1 + T_I s) \quad (33)$$
$$P(s) = -\beta_1$$
$$M(s) = \alpha_1$$

Equations (25), (26), and (33) indicate that the setpoint filter means 320 can be comprised of only 1st lag means and lead/lag means, as is illustrated in FIG. 18.

$T_I s/(1+T_I s)$ and $T_D s/(1+T_D s)$ can be rewritten as follows:

$$T_I s/(1+T_I s) = 1 - 1/(1+T_I s) \quad (34)$$

$$T_D s/(1+\eta T_D s) = (1/\eta)[1 - 1/(1+\eta T_D s)] \quad (\eta \neq 0) \quad (35)$$

Hence, the setpoint filter means 320 can have the structure shown in FIG. 19. As is shown in FIG. 19, the transfer function 88 may be composed of a subtracter means 88a, a 1st lag means 88b, and a subtracter means 88c, and a transfer function 90 is constituted by a 1st lag means 90a and a subtracter means 90b. Thus, the setpoint filter means 320 comprises only three 1st lag means 80, 88b, and 90.

As has been described, the control section of the 2DOF PID controller shown in FIG. 16 to 19 operates in accordance with an PI algorithm, whereas the filter section thereof has the setpoint filter means 320 which receives a setpoint value SV and a control value PV and performs derivative operations in accordance with the control algorithm desired and designated. The PID controller can, therefore, execute a 2DOF PID algorithm. In addition, the PID controller can execute a one degree of freedom PID control, an incomplete two degree of freedom PID control, and a complete 2DOF PID control, only if the 2DOF coefficients $\alpha_1$, $\beta_1$, and $\gamma_1$ are set to the values specified in the following table.

TABLE

| No. | α1 | β1 | γ1 | Control Algorithm | Remarks |
|---|---|---|---|---|---|
| 1 | 1 | 0 | 0 | General PID control (deviation PID) | 1DOF PID |
| 2 | 1 | 0 | 0 | PI-D control (derivative-on-PV) | 1DOF PID |
| 3 | 0 | 0 | 0 | I-PD control | 1DOF PID |
| 4 | α | 0 | 0 | P-I-PD control | Incomplete (2DOF for P only) 2DOF PID |
| 5 | α | 0 | γ | PD-I-PD control | Incomplete (2DOF for PD only) 2DOF PID |
| 6 | α | β | 0 | PI-PID control | Incomplete (2DOF for PI only) 2DOF PID |
| 7 | α | β | γ | PID-PID control | Complete 2DOF PID |

As has been pointed out, the conventional 2DOF PID controller comprises a setpoint filter means and a control section having a non-linear means and designed to perform a PID control of derivative-on-PV type. The combination of the setpoint filter means and the control section cannot effect a complete non-linear operation on a deviation. By contrast, the control section of the 2DOF PID controller according to the invention has no derivative operation means at all, and the setpoint filter means thereof receives a setpoint value and a control value and performs derivative operations in accordance with a control algorithm desired and designated. The output of the setpoint filter means is supplied to the control section, which performs both a non-linear operation and a PI control operation. Therefore, the 2DOF PID controller of the invention can perform non-linear operation on P, I, and D, with ease, accuracy, and freedom. The 2DOF PID controller can operate at high efficiency.

Moreover, the 2DOF PID controller according to the invention requires only three 1st lag means, whereas the conventional 2DOF PID controller (FIG. 1) needs to have six 1st lag means. Hence, the 2DOF PID controller of the invention can be smaller and simpler than the conventional one, serving to improve the fundamentals of plant-controlling PID systems. In view of this, the present invention can greatly contributes to various fields of industry.

The embodiments described above have non-linear means 30. Nevertheless, the present invention can be applied to 2DOF controllers which do not have non-linear means.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A two-degree of freedom PID controller comprising:
   setpoint filter means for performing a derivative operation on a process disturbance signal in accordance with a setpoint value and a control value of a controlled system, thereby outputting a setpoint signal;
   PI-control operation means for determining a deviation between said setpoint signal and said control value, and performing a PI-control operation on the deviation, thereby outputting a manipulative signal; and
   adder means for adding the process disturbance signal to the manipulative signal output by said PI-control operation means, thus obtaining a sum signal, and for supplying the sum signal to the controlled system;
   wherein said setpoint filter means includes:
   gain coefficient multiplying means for multiplying the setpoint value by a two degree of freedom coefficient of a proportional gain, thereby outputting a first product;
   first subtracter means for subtracting the first product from the setpoint value, thereby outputting a first difference;
   first 1st lag means having a two degree of freedom coefficient for an integral time, for performing a 1st lag operation on the first difference, thereby outputting a first result of the 1st lag operation;
   derivative time coefficient multiplying means for multiplying the first product by a two degree of freedom coefficient of a derivative time, thereby outputting a second product;
   second subtracter means for subtracting the control value from the second product, thereby outputting a second difference;
   incomplete derivative means for receiving the second difference and performing an incomplete derivative operation on the second difference, thereby outputting a result of the incomplete derivative operation;
   third subtracter means for subtracting the result of the incomplete derivative operation from the first result of the 1st lag operation, thereby outputting a third difference;
   second 1st lag means for performing a 1st lag operation on the third difference, thereby outputting a second result of the 1st lag operation;
   first adder means for adding the second result of 1st lag operation to the result of the incomplete derivative operation, thereby outputting a first sum; and
   second adder means for adding the first sum to the first product, thereby obtaining a second sum, and for supplying the second sum, as a setpoint signal, to said PI-control operation means.

2. The PID controller according to claim 1, wherein said incomplete derivative means includes:
   divider means for dividing the second difference by a predetermined number, thereby outputting a quotient;
   third 1st lag means for performing a 1st lag operation on the quotient output from said divider means, thereby producing an output; and
   fourth subtracter means for subtracting the output of said third 1st lag means from the quotient, thereby producing an output of said incomplete derivative means, which is supplied to said third subtracter means and said first adder means.

3. The PID controller according to claim 1, wherein said PI-control operation means includes non-linear means for performing a non-linear operation on the deviation.

4. A two-degree of freedom PID controller comprising:
   setpoint filter means for performing a derivative operation on a process disturbance signal in accordance with a setpoint value and a control value of a controlled system, thereby outputting a setpoint signal;
   PI-control operation means for determining a deviation between said setpoint signal and said control value, and performing a PI-control operation on the deviation, thereby outputting a manipulative signal; and
   adder means for adding the process disturbance signal to the manipulative signal output by said PI-control operation means, thus obtaining a sum signal, and for supplying the sum signal to the controlled system;
   wherein said setpoint filter means includes:
   gain coefficient multiplying means for multiplying the setpoint value by a two degree of freedom coefficient of a proportional gain, thereby outputting a first product;
   first subtracter means for subtracting the first product from the setpoint value, thereby outputting a first difference;
   first 1st lag means having a two degree of freedom coefficient for an integral time, for performing a 1st lag operation on the first difference, thereby outputting a first result of said 1st lag operation;
   derivative time coefficient multiplying means for multiplying the setpoint value by a two degree of freedom coefficient of a derivative time, thereby outputting a second product;
   second subtracter means for subtracting the control value from the second product, thereby outputting a second difference;
   incomplete derivative means for receiving the second difference and performing an incomplete derivative operation on the second difference, thereby outputting a result of the incomplete derivative operation;
   third subtracter means for subtracting the result of the incomplete derivative operation from the first result of the 1st lag operation, thereby outputting a third difference;
   second 1st lag means for performing a 1st lag operation on the third difference, thereby outputting a second result of the 1st lag operation;
   first adder means for adding the second result of the 1st lag operation to the result of incomplete derivative operation, thereby outputting a first sum; and
   second adder means for adding the first sum to the first product, thereby obtaining a second sum, and for supplying the second sum, as a setpoint signal, to said PI-control operation means.

5. The PID controller according to claim 4, wherein said incomplete derivative means includes:
- divider means for dividing the second difference by a predetermined number, thereby outputting a quotient;
- third 1st lag means for performing a 1st lag operation on the quotient output from said divider means, thereby producing an output; and
- fourth subtracter means for subtracting the output of said third 1st lag means from the quotient, thereby producing an output of said incomplete derivative means, which is supplied to said third substrate means and said first adder means.

6. The PID controller according to claim 4, wherein said PI-control operation means includes non-linear means for performing a non-linear operation on the deviation.

7. A two-degree of freedom PID controller comprising:
- setpoint filter means for performing a derivative operation on a process disturbance signal in accordance with a setpoint value and a control value of a controlled system, thereby outputting a setpoint signal;
- PI-control operation means for determining a deviation between said setpoint signal and said control value, and performing a PI-control operation on the deviation, thereby outputting a manipulative signal; and
- adder means for adding the process disturbance signal to the manipulative signal output by said PI-control operation means, thus obtaining a sum signal, and for supplying the sum signal to the controlled system;
- wherein said setpoint filter means includes:
- gain coefficient multiplying means for multiplying the setpoint value by a two degree of freedom coefficient of a proportional gain, thereby outputting a first product;
- first subtracter means for subtracting the first product from the setpoint value, thereby outputting a first difference;
- derivative time coefficient multiplying means for multiplying the first product by a two degree of freedom coefficient of a derivative time, thereby outputting a second product;
- second subtracter means for subtracting the control value from the second product, thereby outputting a second difference;
- incomplete derivative means for receiving the second difference and performing an incomplete derivative operation on the second difference, thereby outputting a result of the incomplete derivative operation;
- third subtractor means for subtracting the result of the incomplete derivative operation from the first difference, thereby outputting a third difference;
- 1st lag means for performing a 1st lag operation on the third difference, thereby outputting a result of the 1st lag operation;
- first adder means for adding the result of 1st lag operation to the result of the incomplete derivative operation, thereby outputting a first sum; and
- second adder means for adding the first sum to the first product, thereby obtaining a second sum, and for supplying the second sum, as a setpoint signal, to said PI-control operation means.

8. The PID controller according to claim 7, wherein said incomplete derivative means includes:
- divider means for dividing the second difference by a predetermined number, thereby outputting a quotient;
- second 1st lag means for performing a 1st lag operation on the quotient output from said divider means, thereby producing an output; and
- fourth subtracter means for subtracting the output of said second 1st lag means from the quotient, thereby producing an output of said incomplete derivative means, which is supplied to said third subtracter means and said first adder means.

9. The PID controller according to claim 7, wherein said PI-control operation means includes non-linear means for performing a non-linear operation on the deviation.

10. A two-degree of freedom PID controller comprising:
- setpoint filter means for performing a derivative operation on a process disturbance signal in accordance with a setpoint value and a control value of a controlled system, thereby outputting a setpoint signal;
- PI-control operation means for determining a deviation between said setpoint signal and said control value, and performing a PI-control operation on the deviation, thereby outputting a manipulative signal; and
- adder means for adding the process disturbance signal to the manipulative signal output by said PI-control operation means, thus obtaining a sum signal, and for supplying the sum signal to the controlled system;
- wherein said setpoint filter means includes:
- gain coefficient multiplying means for multiplying the setpoint value by a two degree of freedom coefficient of a proportional gain, thereby outputting a first product;
- first subtracter means for subtracting the first product from the setpoint value, thereby outputting a first difference;
- derivative time coefficient multiplying means for multiplying the setpoint value by a two degree of freedom coefficient of a derivative time, thereby outputting a second product;
- second subtracter means for subtracting the control value from the second product, thereby outputting a second difference;
- incomplete derivative means for receiving the second difference and performing an incomplete derivative operation on the second difference, thereby outputting a result of the incomplete derivative operation;
- third subtracter means for subtracting the result of the incomplete derivative operation from the first difference, thereby outputting a third difference;
- 1st lag means for performing a 1st lag operation on the third difference, thereby outputting a result of the 1st lag operation;
- first adder means for adding the result of 1st lag operation to the result of the incomplete derivative operation, thereby outputting a first sum; and
- second adder means for adding the first sum to the first product, thereby obtaining a second sum, and for supplying the second sum, as a setpoint signal, to said PI-control operation means.

11. The PID controller according to claim 10, wherein said incomplete derivative means includes:
divider means for dividing the second difference by a predetermined number, thereby outputting a quotient;
second 1st lag means for performing a 1st lag operation on the quotient output from said divider means, thereby producing an output; and
fourth subtracter means for subtracting the output of said second 1st lag means from the quotient, thereby producing an output of said incomplete derivative means, which is supplied to said third subtracter means and said first adder means.

12. The PID controller according to claim 11, wherein said PI-control operation means includes non-linear means for performing a non-linear operation on the deviation.

13. A two-degree of freedom controller comprising:
setpoint filter means for receiving a setpoint value and generating a setpoint signal, said setpoint filter means including:
coefficient multiplying means for multiplying the setpoint value by a two-degree of freedom coefficient for a proportional gain, thereby outputting a product;
subtracter means for subtracting the product from the setpoint value to obtain a difference;
first 1st lag means, having at least a two-degree of freedom coefficient for an integral time, for performing a 1st lag operation on the difference, thereby generating a first 1st lag output;
second 1st lag means, coupled to the first 1st lag means, for performing a 1st lag operation on the first 1st lag output, thereby obtaining a second 1st lag output; and
means for adding the product to the second 1st lag output, thereby outputting the setpoint signal;
PI-control operation means for determining a deviation between the setpoint signal and a control value supplied from a controlled system, and performing a PI-control operation on the deviation, thereby outputting a manipulative signal; and
adder means for adding a process disturbance signal to the manipulative signal output by said PI-control operation means, thus obtaining a sum signal, and for supplying the sum signal to said controlled system.

14. A two-degree of freedom controller comprising:
setpoint filter means for receiving a setpoint value and generating a setpoint signal, said setpoint filter means including:
coefficient multiplying means for multiplying the setpoint value by a two-degree of freedom coefficient for a proportional gain, thereby outputting a product;
first subtracter means for subtracting the product from the setpoint value, thereby obtaining a first difference;
first 1st lag means having a two-degree of freedom coefficient for an integral time, for receiving the first difference and performing a 1st lag operation on the first difference to output a first 1st lag output;
first adder means for adding the first difference to the first 1st lag output to obtain a sum;
second 1st lag means for delaying the sum and outputting a second 1st lag output; and
second subtracter means for subtracting the first 1st lag output from the second 1st lag output, thereby obtaining a second difference; and
means for adding the product to the second difference, thereby outputting the setpoint signal;
PI-control operation means for determining a deviation between the setpoint signal and a control value supplied from a controlled system, and performing a PI-control operation on the deviation, thereby outputting a manipulative signal; and
second adder means for adding a process disturbance signal to the manipulative signal output by said PI-control operation means, thus obtaining a sum signal, and for supplying the sum signal to the controlled system.

15. A two-degree of freedom PID controller comprising:
gain coefficient multiplying means for multiplying a setpoint value by a two degree of freedom coefficient of a proportional gain, thereby outputting a first product;
derivative time coefficient multiplying means for multiplying the setpoint value by a two degree of freedom coefficient of a derivative time, thereby outputting a second product;
first 1st lag means for performing 1st lag operation on the setpoint value, thereby outputting a first result of the 1st lag operation;
integral time coefficient multiplying means for multiplying the result of the 1st lag operation by a two degree of freedom coefficient of an integral time, thereby outputting a third product;
incomplete derivative means for performing an incomplete derivative operation on the second product and a control value supplied from a controlled system, thereby outputting a result of the incomplete derivative operation;
second 1st lag means for performing 1st lag operation on the first product, the third product, and the result of the incomplete derivative operation, thereby outputting a second result of 1st lag operation;
first adder means for adding the first and second results of 1st lag operation, thereby outputting a setpoint signal;
PI-control operation means for determining a deviation between the setpoint signal and the control value and performing a PI-control operation on the deviation, thereby outputting a manipulative signal; and
second adder means for adding a process disturbance signal to the manipulative signal, thus obtaining a sum signal, and for supplying the sum signal to said controlled system.

16. The PID controller according to claim 15, wherein said PI-control operation means includes non-linear means for performing a non-linear operation on the deviation.

17. A two-degree of freedom controller comprising:
setpoint filter means for receiving a setpoint value and generating a setpoint signal, said setpoint filter means including:
coefficient multiplying means for multiplying the setpoint value by a two-degree of freedom coefficient for a proportional gain, thereby outputting a product;

first subtracter means for subtracting the product from the setpoint value, thereby obtaining a first difference;

first 1st lag means, having a two-degree of freedom coefficient for an integral time, for receiving the setpoint value and performing a 1st lag operation on the setpoint value to output a 1st lag output;

second subtracter means for subtracting the 1st lag output from the first difference, thereby obtaining a second difference;

second 1st lag means for delaying the second difference and outputting a second 1st lag output; and means for adding the product to the second 1st lag output, thereby outputting the setpoint signal;

PI-control operation means for determining a deviation between the setpoint signal and a control value supplied from a controlled system, and performing a PI-control operation on the deviation, thereby outputting a manipulative signal; and adder means for adding a process disturbance signal to the manipulative signal output by said PI-control operation means, thus obtaining a sum signal, and for supplying the sum signal to the controlled system.

18. A two-degree of freedom controller comprising:

setpoint filter means for receiving a setpoint value and generating a setpoint signal, said setpoint filter means including:

coefficient multiplying means for multiplying the setpoint value by a two-degree of freedom coefficient for a proportional gain, thereby outputting a product;

first subtracter means for subtracting the product from the setpoint value, thereby obtaining a first difference;

first 1st lag means, having a two-degree of freedom coefficient for an integral time, for receiving the setpoint value and performing a 1st lag operation on the setpoint value to output a first 1st lag output;

first adder means for adding the first 1st lag output to the first difference, thereby obtaining a sum;

second 1st lag means for delaying the sum and outputting a second 1st lag output;

second subtracter means for subtracting the first 1st lag output from the second 1st lag output, thereby obtaining a second difference; and means for adding the second difference to the product, thereby obtaining the setpoint signal;

PI-control operation means for determining a deviation between the setpoint signal and a control value supplied from a controlled system, and performing a PI-control operation on the deviation, thereby outputting a manipulative signal; and second adder means for adding a process disturbance signal to the manipulative signal output by said PI-control operation means, thus obtaining a sum signal, and for supplying the sum signal to the controlled system.

* * * * *